United States Patent
Lee et al.

(10) Patent No.: US 12,449,256 B1
(45) Date of Patent: Oct. 21, 2025

(54) COMPACT GRATING MAGNETO-OPTICAL TRAP SENSOR HEAD FOR INERTIAL NAVIGATION IN DYNAMIC ENVIRONMENTS

(71) Applicant: National Technology & Engineering Solutions of Sandia, LLC, Albuquerque, NM (US)

(72) Inventors: Jongmin Lee, Albuquerque, NM (US); Grant Biedermann, Norman, OK (US); Aaron M. Ison, Albuquerque, NM (US); Daniel Paul Gillund, Edgewood, NM (US); David Bossert, Albuquerque, NM (US); Kyle H. Fuerschbach, Albuquerque, NM (US); Charles A. Walker, Albuquerque, NM (US); Peter Schwindt, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 1046 days.

(21) Appl. No.: 17/498,216

(22) Filed: Oct. 11, 2021

Related U.S. Application Data

(60) Provisional application No. 63/109,535, filed on Nov. 4, 2020.

(51) Int. Cl.
   *G01C 19/64* (2006.01)
   *G21K 1/00* (2006.01)

(52) U.S. Cl.
   CPC ............. *G01C 19/64* (2013.01); *G21K 1/006* (2013.01)

(58) Field of Classification Search
   CPC .................................. G01C 19/64; G21K 1/006
   See application file for complete search history.

(56) References Cited

U.S. PATENT DOCUMENTS

| | | | |
|---|---|---|---|
| 8,803,072 B2* | 8/2014 | Booth | C23C 14/544 |
| | | | 324/71.3 |
| 11,269,111 B2* | 3/2022 | Lamb | G01V 7/14 |
| 11,545,815 B1* | 1/2023 | Lentine | H01S 3/0078 |
| 12,038,285 B1* | 7/2024 | Lee | G01C 21/18 |
| 12,367,414 B2* | 7/2025 | Goldman | G06N 10/40 |
| 12,411,281 B2* | 9/2025 | Zandi | G02B 6/136 |
| 2014/0022534 A1* | 1/2014 | Strabley | G01P 15/093 |
| | | | 356/72 |

(Continued)

OTHER PUBLICATIONS

Mielec, N., et al. "Atom interferometry with top-hat laser beams." Applied Physics Letters 113.16 (2018) (Year: 2018).*

(Continued)

*Primary Examiner* — Wyatt A Stoffa
(74) *Attorney, Agent, or Firm* — Mark A. Dodd

(57) ABSTRACT

A compact grating-mirror magneto-optical trap (GMOT) cold atom inertial sensor head is disclosed. To make the sensor head compatible with the high vibration levels encountered in dynamic environments, the number of optical ports in the vacuum chamber is minimized and various components, including fixed optical components and a reflective grating chip, are hard mounted within the vacuum chamber. The use of the reflective grating chip reduces the number of optical ports required for cooling beams from six to one. The number of optical ports is further reduced by time multiplexing multiple beams passing through a given optical port.

18 Claims, 12 Drawing Sheets

(56) References Cited

U.S. PATENT DOCUMENTS

| | | | |
|---|---|---|---|
| 2016/0298967 A1* | 10/2016 | Johnson | G01C 19/58 |
| 2019/0200445 A1* | 6/2019 | Imhof | H05H 3/04 |
| 2019/0376790 A1* | 12/2019 | Barrett | G01C 21/16 |
| 2020/0120785 A1* | 4/2020 | Eckel | H05H 3/02 |
| 2020/0150446 A1* | 5/2020 | Thibon | G02B 27/46 |
| 2022/0163331 A1* | 5/2022 | Kasevich | G01V 7/04 |

OTHER PUBLICATIONS

Barker, D. S., et al. "Single-beam Zeeman slower and magneto-optical trap using a nanofabricated grating." Physical review applied 11.6 (2019): 064023 (Year: 2019).*

Lee, J. et al., "Sub-Doppler cooling of neutral atoms in a grating magneto-optical trap," J. Opt. Soc. Am. B (2013) 30 (11):2869-2874.

Little, B. J. et al., "A passively pumped vacuum package sustaining cold atoms for more than 200 days," AVS Quantum Science (2021) 3:035001-1-035001-5.

Mcguiness, H. J. et al., "High data-rate atom interferometer for measuring acceleration," Applied Physics Letters (2012) 100:011106, 4 pages.

Perrin, I. et al., "Zero-velocity atom interferometry using a retroreflected frequency-chirped laser," Physical Review A (2019) 100:053618, 8 pages.

\* cited by examiner

1100

1200

COMPACT GRATING MAGNETO-OPTICAL TRAP SENSOR HEAD FOR INERTIAL NAVIGATION IN DYNAMIC ENVIRONMENTS

RELATED APPLICATIONS

This application claims priority to U.S. Provisional Application No. 63/109,535, filed on Nov. 4, 2020, and entitled COMPACT GRATING-BASED MAGNETO-OPTICAL TRAP SENSOR HEAD FOR COLD ATOM INERTIAL SENSORS IN DYNAMIC ENVIRONMENTS, the entirety of which is incorporated herein by reference.

STATEMENT OF GOVERNMENT INTEREST

This invention was made with Government support under Contract No. DE-NA0003525 awarded by the United States Department of Energy/National Nuclear Security Administration. The Government has certain rights in the invention.

TECHNICAL FIELD

The present invention relates to a sensor head for use in atom interferometry, and in particular, to a compact sensor head that can be used to generate a grating-based magneto-optical trap with minimal alignment of the components.

BACKGROUND

High-precision positioning, navigation, and timing (PNT) sensors are needed for advanced positional awareness in global positioning system (GPS) denied navigation and high dynamic environments. Cold atom sensors have accomplished the state-of-the-art records of sensitivities and accuracies in atomic clocks, gravimeters, gravity gradiometers, accelerometers, gyroscopes, magnetometers, and electrometers that are comparable to the best classical sensors. The development of a compact cold atom interferometer inertial sensor deployable in dynamic environments, e.g., 1.5 to 9 g, is a significant and urgent goal for industrial and defense applications. Cold atom sensor platforms having a compact size, low weight, low power, and immunity from high dynamics and vibration noise are of particular interest.

Cold atom inertial sensors, such as atomic accelerometers and gyroscopes, are based on the light pulse sequence of the atomic interferometry (AI) process. The sensor head is tethered to optical and control systems, which include optical and vacuum components, generate cold atoms released from a magneto-optical trap (MOT), and drive the light pulses of stimulated Raman transitions, i.e., two counter-propagating Raman beams, for the AI process. Traditionally, six cooling beams and a repump beam with a magnetic field gradient were needed to generate the MOT, and additional sub-Doppler cooling enabled one to reach atomic temperatures of 10 K or less. After the initial state preparation with an optical-pump/depump beam, the cooled atoms in free space become the subject of the AI through a light-pulse sequence, for example, $\pi/2 \rightarrow \pi \rightarrow \pi/2$. This light pulse sequence gives photon recoils on the atoms to split, redirect, and recombine matterwaves for atomic interference. The atomic interference fringe is sensitive to inertial forces, which can be used to measure accelerations and angular velocities by detecting the atomic population with a detection beam at the end of the AI process. Thus, the sensor head may need to accurately align as many as ten different beams to successfully create, interact with, and measure the atomic cloud—a daunting task. See H. J. McGuinness et al., "High data-rate interferometer for measuring accelerating," Applied Physics Letters, vol. 100, art. no. 011106 (2012), the contents of which are incorporated herein by reference.

A number of potential AI applications will subject the sensor head to a highly dynamic environment, which may be further challenging due to the need to maintain the alignment of the ten beams. For example, the optical fibers coupling the various beams to the sensor head are sensitive to temperature variation and vibration, and therefore it is desirable to reduce the number of optical fibers between the sensor head and the optical systems. In a laboratory experiment setting, the traditional optomechanical elements used for directing or guiding beams are not amenable to the accelerations, rotations, and vibrations encountered in these highly dynamic environments as they may quickly or eventually be knocked out of their aligned positions. For a large form-factor sensor head with longer distances between optomechanical elements and from the optomechanical elements to the atomic cloud, even minor misalignments due to accelerations, rotations, and vibrations can cause a beam to "walk-off" the downstream elements and limit the reliability of AI operation in dynamic environments. Thus, a compact sensor head with fixed optical components would have advantages in dynamic environment AI applications over a large form-factor sensor head.

Thus, a need exists for a compact sensor head that simplifies the alignment of the beams needed to create, interact with, and measure an atomic cloud, but that can simultaneously withstand a highly dynamic environment.

SUMMARY

One aspect of the present invention relates to minimizing the number of beams required within the sensor head employed in the cold atom sensor platform. To this end, the previous six cooling beams input to the sensor head is reduced to only a single input cooling beam through use of a reflective grating chip with three 1-D grating sections to create three diffractive beams, i.e., diffracted cooling beams, within the sensor head, resulting in a tetrahedral grating-mirror MOT (GMOT) configuration. See J. Lee et al., "Sub-Doppler cooling of neutral atoms in a grating magneto-optical trap," Journal of the Optical Society of America A, vol. 30, no. 11, pp. 2869-2874 (2013) and B. J. Little et al., "A passively pumped vacuum package sustaining cold atoms for more than 200 days," AVS Quantum Science, vol. 3, art. no. 035001 (2021), the contents of each of which are incorporated herein by reference.

A further aspect of the present invention relates to a compact and physically robust sensor head that can withstand the vibrations typically encountered in highly dynamic environments. In the sensor head, the fixed optical components have been implemented for optical channels through precision six-axis piezoelectric stages for active alignment. A retainer ring with clips was developed to hold the reflective grating chip in the vacuum chamber of the sensor head without epoxy for these dynamic environments. A similar mounting system may be employed for one or more other elements in the vacuum chamber. The interior structure of the sensor head has been designed to reliably hold the vacuum chamber in dynamic environments. Random vibration analysis has been applied to the design of the sensor head to understand and minimize the mechanical displacement of various elements under a given dynamic environment.

In at least one embodiment, a compact grating magneto-optical trap sensor head comprises a vacuum chamber (the vacuum chamber supporting an atomic cloud for atomic interferometry, the vacuum chamber including at least one mounting port and at least two optical ports), cooling beam optics (the cooling beam optics receiving a cooling beam, creating a flat-top cooling beam by causing a radial intensity of the cooling beam to be approximately uniform, and transmitting the flat-top cooling beam through a first of the at least two optical ports), a reflective grating chip (the reflective grating chip receiving the flat-top cooling beam and diffracting the received flat-top cooling beam into at least three diffracted cooling beams, the flat-top cooling beam and the at least three diffracted cooling beams cooling the atomic cloud, the reflective grating chip being hard mounted to a first of the at least one mounting port, the reflective grating chip being located within the vacuum chamber), atom detection optics (the atom detection optics receiving atomic fluorescence from the atomic cloud), Raman separator optics (the Raman separator optics receiving a combined pair of cross-linearly-polarized Raman beams and separating the combined pair of cross-linearly-polarized Raman beams into first and second counterpropagating Raman beams, the Raman separator optics directing the first and second counterpropagating Raman beams through a second of the at least two optical ports, the Raman separator optics directing the second counterpropagating Raman beam to the atomic cloud, the first and second counterpropagating Raman beams implementing atomic interferometry with the atomic cloud), Raman redirector optics (the Raman redirector optics receiving the first counterpropagating Raman beam and redirecting the received first counterpropagating Raman beam to the atomic cloud such that the first and second counterpropagating Raman beams are substantially overlapping and counterpropagating through the atomic cloud), and a pair of anti-Helmholtz coils (the pair of anti-Helmholtz coils generating a magnetic field gradient for a magneto-optical trap, the magneto-optical trap necessary to create the atomic cloud, a first of the pair of anti-Helmholtz coils adjacent a first face of the vacuum chamber, a second of the anti-Helmholtz coils adjacent a second face of the vacuum chamber opposite the first face of the vacuum chamber).

In various embodiments, the cooling beam optics include at least one lens set (the at least one lens set receiving the cooling beam, expanding the cooling beam, and causing a radial intensity of the cooling beam to be approximately uniform, the at least one lens set including at least one of two concave lenses and an achromatic doublet lens; two achromatic doublet lenses, an intensity corrector, and a phase corrector; a beam shaper; or an apodizing filter), a polarizer (the polarizer receiving and linearly polarizing the expanded cooling beam), and a quarter-wave plate (the quarter-wave plate receiving and circularly polarizing the linearly polarized expanded cooling beam and transmitting the circularly polarized cooling beam through the first of the at least two optical ports as the flat-top cooling beam); the cooling beam optics further receiving a depump beam and transmitting the depump beam through the first of the at least two optical ports; the compact grating magneto-optical trap sensor head further comprises a flanged pedestal (the flanged pedestal welded or brazed to a first of the at least one mounting port) and a set of clips (the set of clips attaching the reflective grating chip to the flanged pedestal, the reflective grating chip thereby being hard mounted to the first of the at least one mounting port); and the reflective grating chip includes at least three sections (each of the at least three sections comprises a corresponding grating, each grating comprises one of a binary grating, a multi-level grating, or a blazed grating), and the reflective grating chip optionally includes an orifice at the center thereof (the orifice reducing reflection of the flat-top cooling beam).

In other embodiments, the atom detection optics include a lens set (the lens set receiving and focusing atomic fluorescence from the atomic cloud passing through a third of the at least two optical ports onto an optical fiber); the atom detection optics include an atom detection photodetector (the atom detection photodetector receiving atomic fluorescence from the atomic cloud and outputting a signal indicative of a power of the atomic fluorescence from the atomic cloud), and a filter (the filter spatially or frequency filtering extraneous light directed toward the atom detection photodetector, the filter being located between the atomic cloud and the atom detection photodetector), the atom detection photodetector being one of hard mounted and located within the vacuum chamber or hard mounted and located external and adjacent to the vacuum chamber; and the Raman separator optics include a first polarizing beam splitter (the first polarizing beam splitter receiving and separating the combined pair of cross-linearly-polarized Raman beams into the first and second counterpropagating Raman beams, the first polarizing beam splitter directing the first counterpropagating Raman beam to the Raman redirector optics through the second of the at least two optical ports and redirecting the second Raman beam), a 45°-angled mirror (the 45°-angled mirror receiving and redirecting the second counterpropagating Raman beam to the atomic cloud through the second of the at least two optical ports), and optionally at least one lens set (the at least one lens set receiving the combined pair of cross-linearly-polarized Raman beams and causing a radial intensity of the combined pair of cross-linearly-polarized Raman beams to be approximately uniform, the at least one lens set including at least one of two concave lenses and an achromatic doublet lens; two achromatic doublet lenses, an intensity corrector, and a phase corrector; a beam shaper; or an apodizing filter), the first counterpropagating Raman beam being substantially parallel to, and laterally offset from, the second counterpropagating Raman beam as the first and second counterpropagating Raman beams pass from the Raman separator optics to the vacuum chamber through the second of the at least two optical ports.

In yet other embodiments, the Raman separator optics include a first polarizing beam splitter (the first polarizing beam splitter receiving and separating the combined pair of cross-linearly-polarized Raman beams into the first and second counterpropagating Raman beams, the first polarizing beam splitter directing the first counterpropagating Raman beam to the Raman redirector optics through the second of the at least two optical ports and redirecting the second counterpropagating Raman beam), a second polarizing beam splitter (the second polarizing beam splitter receiving and redirecting the second counterpropagating Raman beam to the atomic cloud through the second of the at least two optical ports), and optionally at least one lens set (the at least one lens set receiving the combined pair of cross-linearly-polarized Raman beams causing a radial intensity of the combined pair of cross-linearly-polarized Raman beams to be approximately uniform, the at least one lens set including at least one of two concave lenses and an achromatic doublet lens; two achromatic doublet lenses, an intensity corrector, and a phase corrector; a beam shaper; or an apodizing filter), the first counterpropagating Raman beam being substantially parallel to, and laterally offset from, the second counterpropagating Raman beam as the first and second counterpropagating Raman beams pass from the Raman separator optics to the vacuum chamber through the second of the at least two optical ports; the Raman separator optics further include a non-polarizing beam splitter (the non-polarizing beam splitter receiving the combined pair of cross-linearly-polarized Raman beams and redirecting a first portion of the combined pair of cross-linearly-polarized Raman beams to the first polarizing beam splitter, the non-polarizing beam splitter transmitting a second portion of the combined pair of cross-linearly-polarized Raman beams), and a photodetector (the photodetector receiving the second portion of the combined pair of cross-linearly-polarized Raman beams and outputting a signal indicative of a beat-note frequency between the combined pair of cross-linearly-polarized Raman beams); and the Raman separator optics further include a first Raman beam photodetector (the first Raman beam photodetector receiving the first counterpropagating Raman beam after the first counterpropagating Raman beam passes through the atomic cloud and the second polarizing beam splitter, the first Raman beam photodetector outputting a signal indicative of a power of the first counterpropagating Raman beam), and a second Raman beam photodetector (the second Raman beam photodetector receiving the second counterpropagating Raman beam after the second counterpropagating Raman beam passes through the atomic cloud, is redirected by the Raman redirector optics, and is redirected by the first polarizing beam splitter, the second Raman beam photodetector outputting a signal indicative of a power of the second counterpropagating Raman beam).

In still other embodiments, the Raman redirector optics include a first turning mirror (the first turning mirror receiving and redirecting the first counterpropagating Raman beam from the Raman separator optics) and a second turning mirror (the second turning mirror receiving the first counterpropagating Raman beam from the first turning mirror and redirecting the first counterpropagating Raman beam to the atomic cloud); the Raman redirector optics being one of hard mounted and located within the vacuum chamber or hard mounted and located external and adjacent to the vacuum chamber; the compact grating magneto-optical trap sensor head further comprises a Raman combiner (the Raman combiner including a polarizing beam splitter (the polarizing beam splitter receiving a pair of cross-linearly-polarized Raman beams and combining the pair of cross-linearly-polarized Raman beams to thereby form the combined pair of cross-linearly-polarized Raman beams), a Raman beam switch (the Raman beam switch receiving the combined pair of cross-linearly-polarized Raman beams and simultaneously switching the combined pair of cross-linearly-polarized Raman beams), and a Raman beam output port (the Raman beam output port receiving the combined pair of cross-linearly-polarized Raman beams and directing the combined pair of cross-linearly-polarized Raman beams to the Raman separator optics)); the Raman combiner further includes a non-polarizing beam splitter (the non-polarizing beam splitter receiving a repump beam and a detection beam and redirecting the repump beam and the detection beam to the Raman beam output port); the Raman combiner further includes an optical monitor (the optical monitor receiving a portion of the combined pair of cross-linearly-polarized Raman beams and outputting a signal indicative of a beat-note between the combined pair of cross-linearly-polarized Raman beams, the signal indicative of the beat-note between the combined pair of cross-linearly-polarized Raman beams enabling control of a phase shifter); the Raman combiner further includes a phase-lock light modulation device (the phase-lock light modulation device receiving one of the pair of cross-linearly-polarized Raman beams and adjusting a phase of the received one of the pair of cross-linearly-polarized Raman beams based upon the signal indicative of the beat-note between the combined pair of cross-linearly-polarized Raman beams, the phase-lock light modulation device thereby locking a phase difference between the combined pair of cross-linearly-polarized Raman beams); and the compact grating magneto-optical trap sensor head further comprises an inertial measurement unit (IMU) co-sensor (the IMU co-sensor outputting a signal indicative of common-mode noise, the signal indicative of common-mode noise enabling rejection of common-mode noise in an atomic interferometry signal due to vibrations).

In at least one embodiment, a compact grating magneto-optical trap sensor head comprises a vacuum chamber (the vacuum chamber supporting an atomic cloud for atomic interferometry, the vacuum chamber includes at least one mounting port and at least two optical ports, a first of the at least two optical ports receiving a combined pair of parallel-linearly-polarized Raman beams and directing the combined pair of parallel-linearly-polarized Raman beams to the atomic cloud, the combined pair of parallel-linearly-polarized Raman beams implementing atomic interferometry with the atomic cloud), cooling beam optics (the cooling beam optics receiving a cooling beam and creating a flat-top cooling beam by causing a radial intensity of the cooling beam to be approximately uniform, the cooling beam optics transmitting the flat-top cooling beam through a second of the at least two optical ports), a reflective grating chip (the reflective grating chip receiving the flat-top cooling beam and diffracting the received flat-top cooling beam into at least three diffracted cooling beams, the flat-top cooling beam and the at least three diffracted cooling beams cooling the atomic cloud, the reflective grating chip being hard mounted to a first of the at least one mounting port, the reflective grating chip being located within the vacuum chamber), atom detection optics (the atom detection optics receiving atomic fluorescence from the atomic cloud), Raman retroreflection optics (the Raman retroreflection optics includes a quarter-wave plate and a mirror, the quarter-wave plate being located between the atomic cloud and the mirror, the Raman retroreflection optics receiving the combined pair of parallel-linearly-polarized Raman beams and reflecting the received combined pair of parallel-linearly-polarized Raman beams to the atomic cloud such that the combined pair of parallel-linearly-polarized Raman beams and the reflected combined pair of parallel-linearly-polarized Raman beams are substantially overlapping and counterpropagating through the atomic cloud), and a pair of anti-Helmholtz coils (the pair of anti-Helmholtz coils generating a magnetic field gradient for a magneto-optical trap, the magneto-optical trap necessary to create the atomic cloud, a first of the pair of anti-Helmholtz coils being adjacent a first face of the vacuum chamber, a second of the anti-Helmholtz coils being adjacent a second face of the vacuum chamber opposite the first face of the vacuum chamber).

In various embodiments, the cooling beam optics include at least one lens set (the at least one lens set receiving the cooling beam and expanding the cooling beam to cause a radial intensity of the cooling beam to be approximately uniform, the at least one lens set including at least one of two concave lenses and an achromatic doublet lens; two achromatic doublet lenses, an intensity corrector, and a phase corrector; a beam shaper; or an apodizing filter), a polarizer (the polarizer receiving and linearly polarizing the expanded cooling beam), a quarter-wave plate (the quarter-wave plate receiving and circularly polarizing the linearly polarized expanded cooling beam and transmitting the circularly polarized cooling beam through the second of the at least two optical ports as the flat-top cooling beam), the compact grating magneto-optical trap sensor head further comprises a flanged pedestal (the flanged pedestal welded or brazed to a first of the at least one mounting port) and a set of clips (the set of clips attaching the reflective grating chip to the flanged pedestal, the reflective grating chip thereby being hard mounted to the first of the at least one mounting port), the reflective grating chip includes at least three sections (each of the at least three sections comprises a corresponding grating, each grating comprises one of a binary grating, a multi-level grating, or a blazed grating) and the reflective grating chip optionally includes an orifice at the center thereof (the orifice reducing reflection of the flat-top cooling beam), and the atom detection optics include (1) a lens set (the lens set receiving and focusing atomic fluorescence from the atomic cloud passing through a third of the at least two optical ports onto an optical fiber), or (2) an atom detection photodetector (the atom detection photodetector receiving atomic fluorescence from the atomic cloud and outputting a signal indicative of a power of the atomic fluorescence from the atomic cloud), and a filter (the filter spatially or frequency filtering extraneous light directed toward the atom detection photodetector, the filter being located between the atomic cloud and the atom detection photodetector), the atom detection photodetector being one of hard mounted and located within the vacuum chamber or hard mounted and located external and adjacent to the vacuum chamber.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the invention, wherein identical reference numerals refer to identical or similar elements or features in different views or embodiments shown in the drawings. The drawings are not to scale and are intended only to illustrate the elements of various embodiments of the present invention.

FIGS. 5A, 5B illustrate a reflective grating chip in accordance with one or more embodiments of the present invention, while

DETAILED DESCRIPTION

Figure 1A:
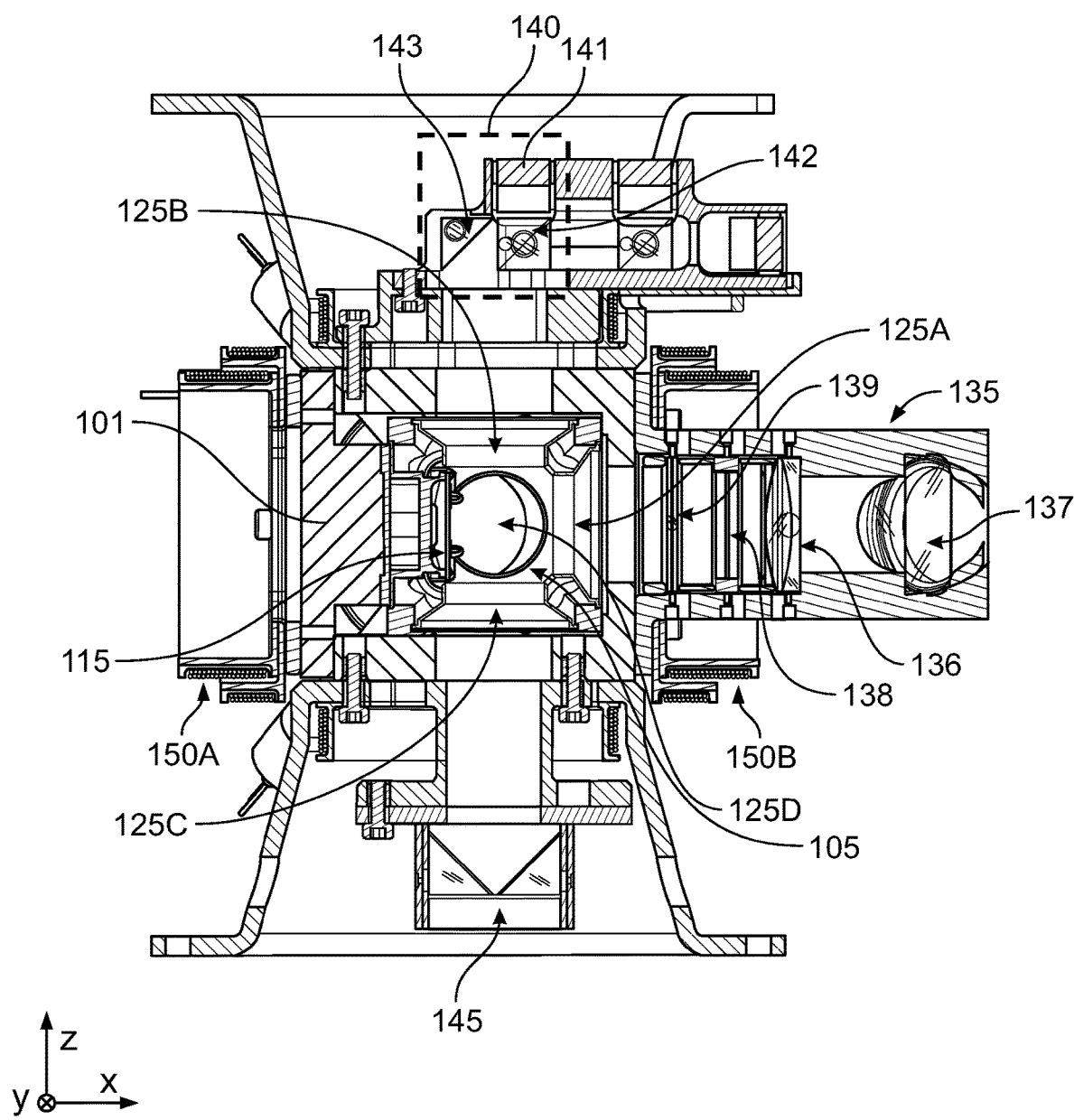
FIGS. 1A and 1B illustrate a cross-sectional view of a first sensor head in accordance with one or more embodiments of the present invention.
Figure 1B:
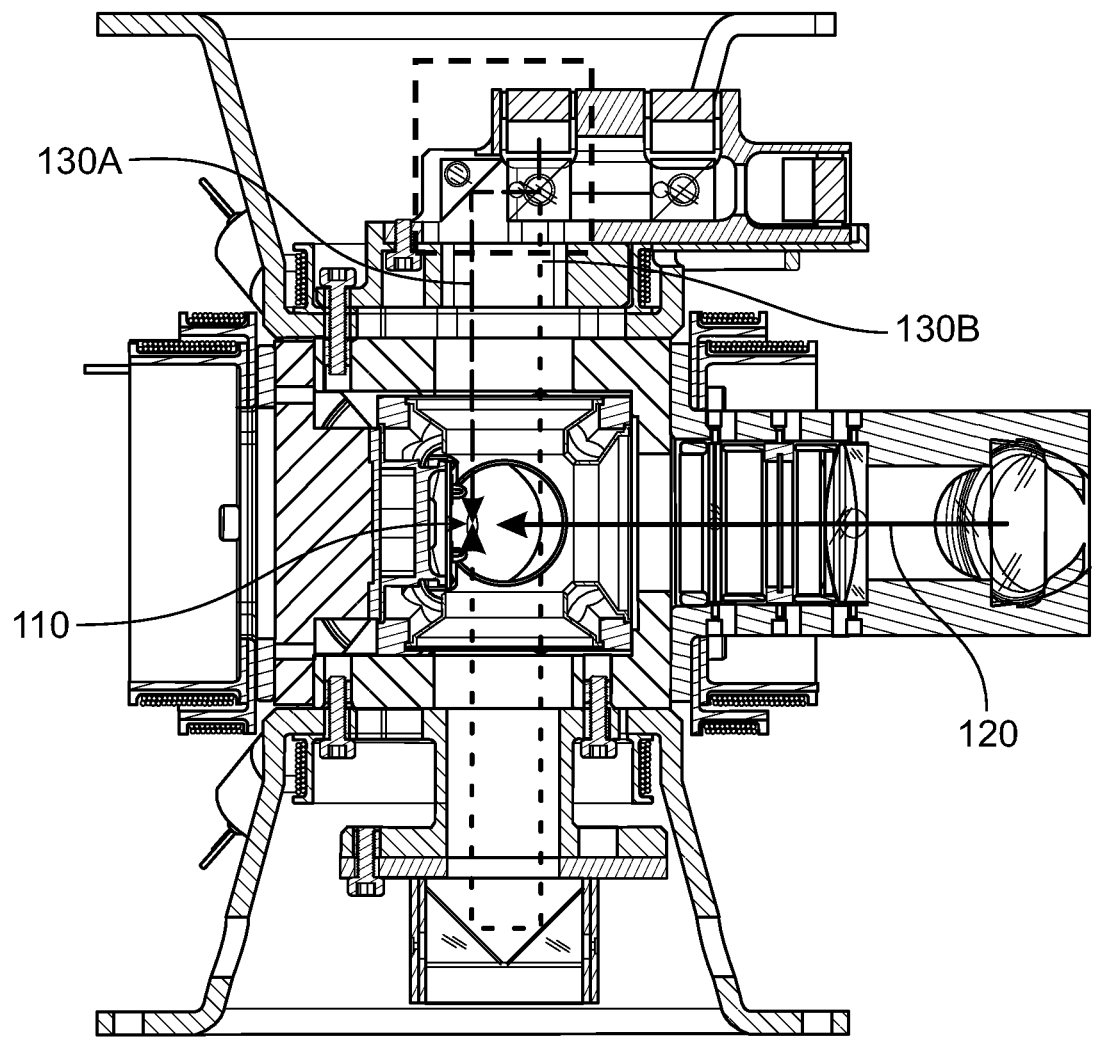

FIG. 1A illustrates a cross-sectional view of a first sensor head 100 in accordance with one or more embodiments, while FIG. 1B illustrates the corresponding optical beams and resultant atomic cloud 110 within the first sensor head 100. At the heart of the first sensor head 100 is a vacuum chamber 105, which provides a physical space in which the atomic cloud 110 is formed. Within the vacuum chamber 105 is a reflective grating chip 115 held by a retainer ring for cooling of the atoms in the atomic cloud 110 with a tetrahedral grating-mirror magneto-optical trap (MOT/GMOT) configuration. For example, the reflective grating chip 115, when illuminated by a single cooling beam 120, will create three diffractive beams (not illustrated) and three additional cooling beams 580A, 580B, 580C, as will be described below with reference to FIG. 5C. The interior structural bracing 101 of the first sensor head 100 has been designed to reliably hold the vacuum chamber 105 in dynamic environments. The interior structural bracing 101 is made, for example, of a glass-reinforced epoxy laminate material such as FR-4. The vacuum chamber 105 may include as many as five optical ports, of which only four optical ports 125A-125D are illustrated in FIG. 1A. These various optical ports 125A-125D will admit the various beams required for the atomic interferometry (AI) process as well as output the atom detection signals from the AI process.

The first sensor head 100 employs two input optical fibers from a laser generating system (not illustrated) to the first sensor head 100 for transmitting: (1) a single cooling beam 120 for creating the GMOT and (2) a combined pair of cross-linearly-polarized Raman beams that will be subsequently separated into a pair of counterpropagating Raman beams 130A, 130B for the AI operation. In addition, there are three additional output multimode fibers: one for atom detection, with corresponding atom detection optics (not shown) coupled to optical port 125D, and two to monitor the optical power of the pair of counterpropagating Raman beams 130A, 130B. The atom detection optics of the first sensor head 100 will be described below with reference to FIG. 6. The cooling beam 120 passes through a set of cooling beam optics 135 before passing through optical port 125A and into the vacuum chamber 105. The cooling beam optics 135 of the first sensor head 100 includes an optical fiber port (not illustrated), two concave lenses (not illustrated), and an achromatic doublet 136 to generate a "truncated" beam profile of a large Gaussian beam with approximately uniform radial intensity. The cooling beam optics 135 of the first sensor head 100 further includes a mirror 137, a polarizer 138, and a quarter-wave plate 139. The cooling beam optics 435, described below with reference to FIG. 7, of the second sensor head 400, provide an alternative way of generating a cooling beam 420 having an approximately uniform radial intensity.

Figure 2:
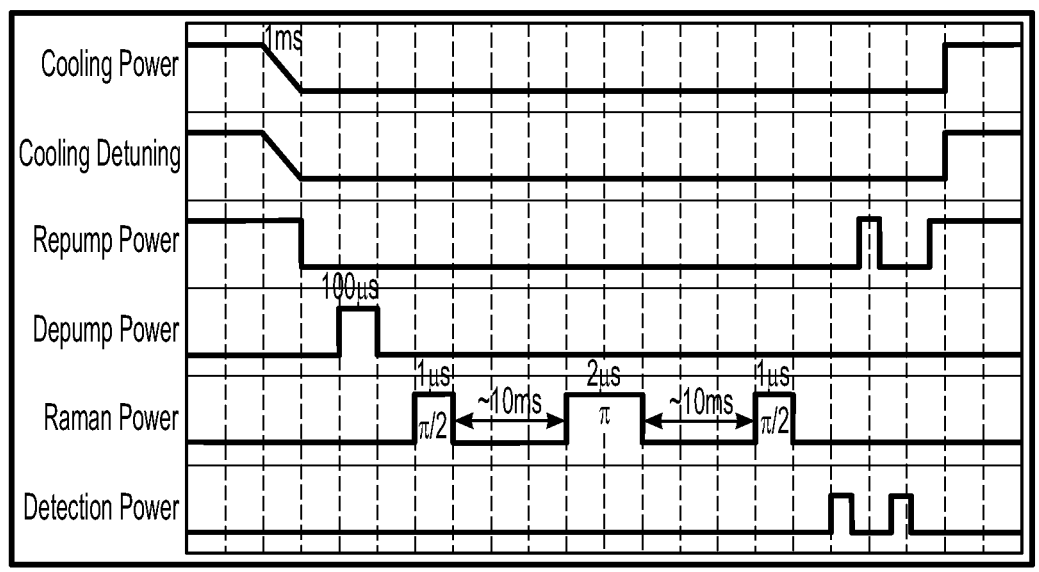
FIG. 2 illustrates a timing and detuning sequence of the optical signals employed by one or more embodiments of the present invention.

The first input optical fiber from the laser generating system to the first sensor head 100, which provides the cooling beam 120, also provides the depump beam by changing the modulation frequency, i.e., detuning, the cooling beam 120 to generate the depump beam as illustrated in the timing and detuning diagram in FIG. 2. The second input optical fiber from the laser generating system to the first sensor head 100 provides the pair of cross-linearly-polarized Raman beams from two separate light modulators that are subsequently combined. The second input optical fiber also provides the repump beam and the detection beam by combining the cross-linearly-polarized Raman beams, the repump beam, and the detection beam using a non-polarizing beamsplitter, with their timing as illustrated in FIG. 2. The repump beam and the detection beam are again generated by changing the modulation frequency, i.e., detuning, of one or more of the pair of cross-linearly-polarized Raman beams. This detuning may be implemented using a single-sideband (SSB) frequency modulator. An exemplary SSB frequency modulatory is disclosed in U.S. patent application Ser. No. 16/831,350, entitled "Compact Laser Source with Frequency Modulators Generating Multiple Lines," and assigned to the same assignee as this application, the contents of which are incorporated herein by reference.

Figure 3:
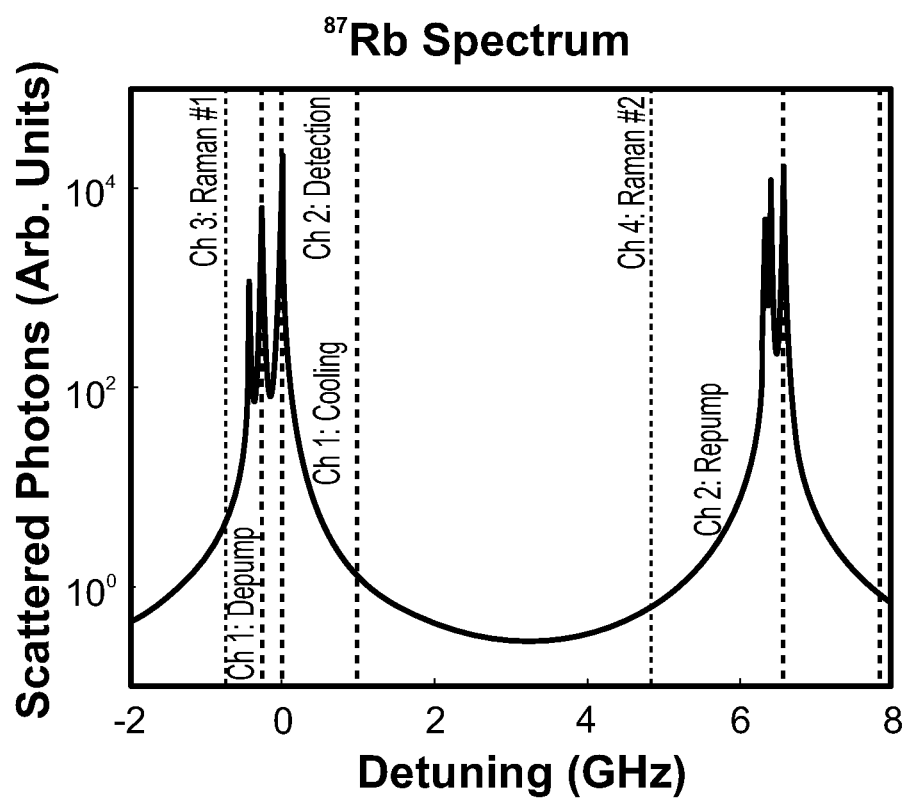
FIG. 3 illustrates the relative detuning of the various optical signals employed by one or more embodiments of the present invention.

FIG. 2 also illustrates the timing sequence for the remaining optical signals during an AI cycle. As illustrated in FIG. 2, due to the different times, wavelengths, and power of the different optical signals, a single optical fiber may handle multiple optical signals, thereby simplifying the process of coupling the optical signals to and from the vacuum chamber 105. FIG. 3 illustrates the relative detuning of the various optical signals when the atomic cloud 110 is formed of $^{87}$Rb, though in other embodiments other suitable atomic species may be used to form the atomic cloud 110, for example, $^{133}$Cs.

U.S. patent application Ser. No. 16/831,350 describes the timing and generation of the different optical signals illustrated in FIGS. 2 and 3. As described in U.S. patent application Ser. No. 16/831,350, because of the timing of the various optical signals, the laser generating system may generate and time division multiplex multiple lines onto a single optical fiber. As reflected in FIGS. 2 and 3, a first optical channel from the laser generating system may carry both the cooling beam 120 and the depump beam as neither will be on simultaneously. In a similar manner, the second optical channel from the laser generating system may carry both the detection beam and the repump beam. Further, the first optical channel may be combined with the second optical channel using a non-polarizing beam splitter and optically coupled to the first input optical fiber from the laser generating system to the first sensor head 100. While the pair of counterpropagating Raman beams 130A, 130B must be delivered simultaneously, the pair of cross-linearly-polarized Raman beams, once generated by two separate light modulators in the laser generating system, can be combined, in certain embodiments, as described below with reference to a Raman combiner 1000 illustrated in FIGS. 10A and 10B and carried by the second input optical fiber from the laser generating system to the first sensor head 100. This combining of various optical signals reduces the number of optical ports 125 required in the vacuum chamber 105.

The combined pair of cross-linearly-polarized Raman beams are separated by a set of Raman separator optics 140 in the first sensor head 100, which includes a first 45°-angled mirror 141, a polarizing beamsplitter 142, and a second 45°-angled mirror 143. The set of Raman separator optics 140 of the first sensor head 100 thereby create the pair of counterpropagating Raman beams 130A, 130B, which are introduced into the vacuum chamber 105 via optical port 125B. One of the counterpropagating Raman beams 130A passes through the vacuum chamber 105 and out the optical port 125C, where it is redirected by Raman redirector optics 145 back into the vacuum chamber 105 via the same optical port 125C. The pair of counterpropagating Raman beams 130A, 130B pass through the atomic cloud 110 in a counterpropagating manner, thereby necessitating both the Raman separator optics 140 and the Raman redirector optics 145 in the first sensor head 100 illustrated in FIG. 1.

The first sensor head 100 includes a pair of anti-Helmholtz coils 150A, 150B on opposite sides of the first sensor head 100. The pair of anti-Helmholtz coils 150A, 150B are used to generate a magnetic field gradient for the MOT necessary to create the atomic cloud 110 used in the AI process.

Figure 4A:
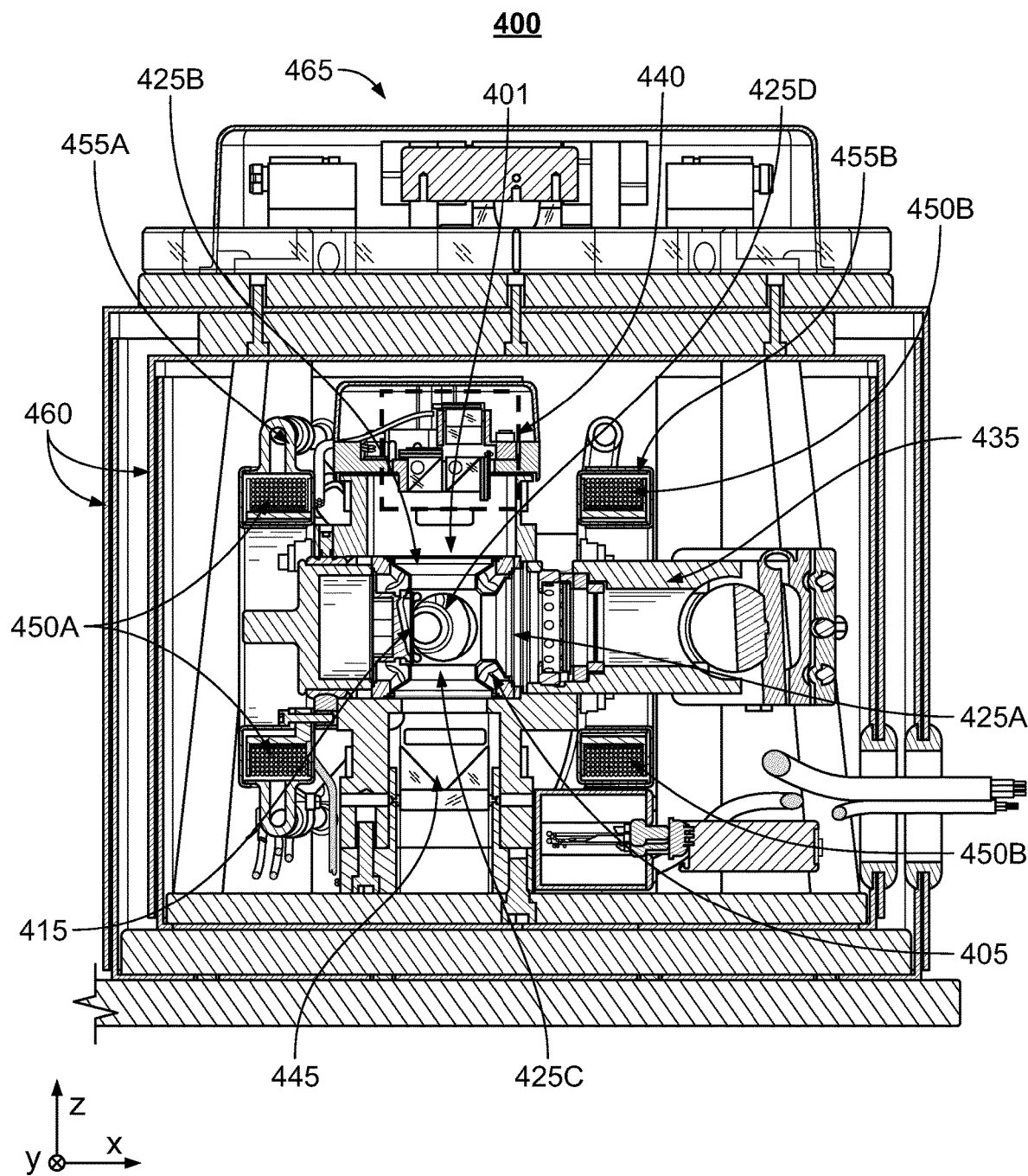
FIGS. 4A and 4B illustrate a cross-sectional view of a second sensor head in accordance with one or more embodiments of the present invention.
Figure 4B:
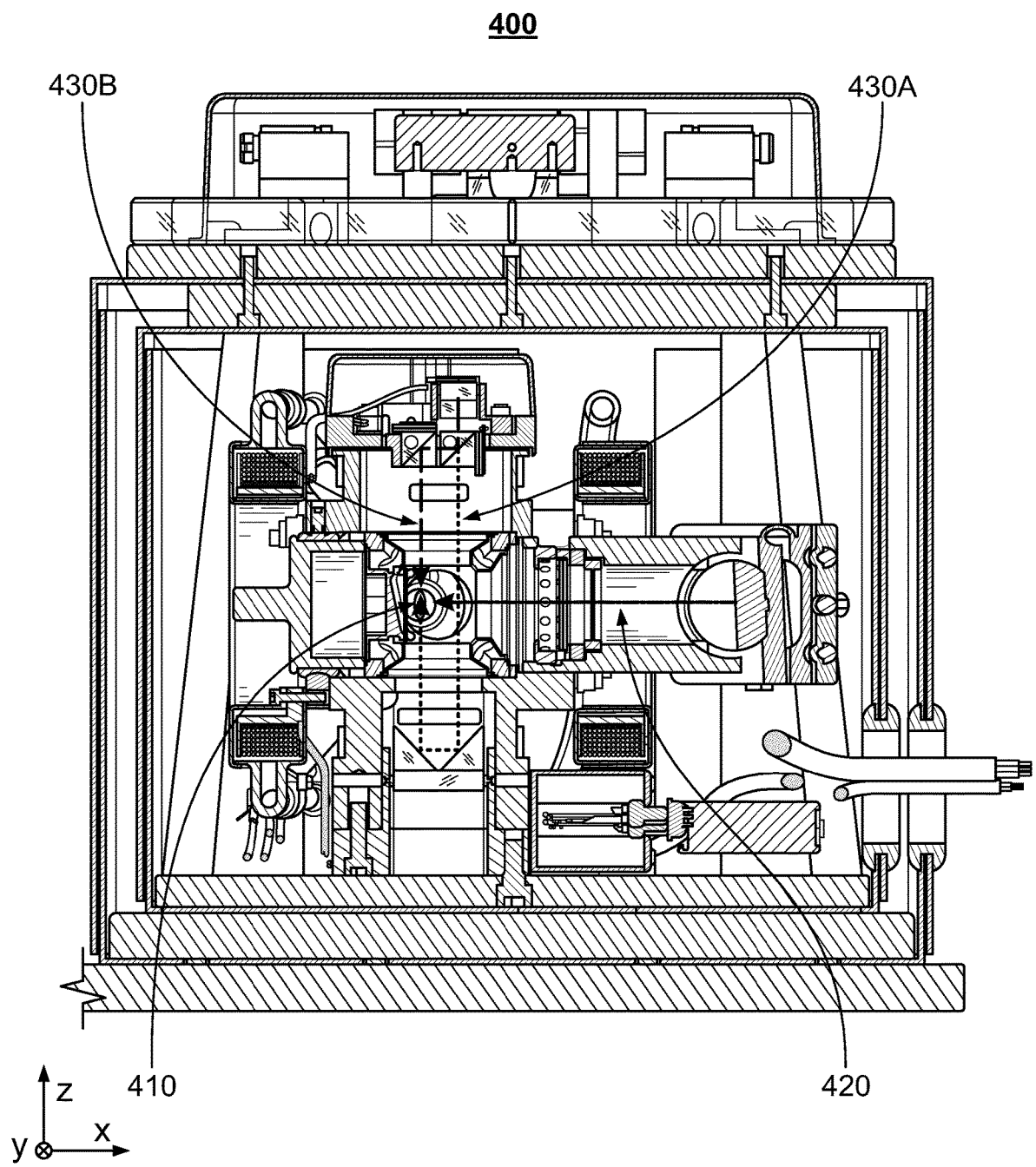

FIG. 4A illustrates a cross-sectional view of a second sensor head 400 in accordance with one or more embodiments, while FIG. 4B illustrates the corresponding beams and resultant atomic cloud 410 within the second sensor head 400. At the heart of the second sensor head 400 is a vacuum chamber 405, which provides a physical space in which the atomic cloud 410 is formed. Within the vacuum chamber 405 is a reflective grating chip 415 held by a retainer ring for cooling of the atoms in the atomic cloud 410 with a tetrahedral GMOT configuration. For example, the reflective grating chip 415, when illuminated by a single cooling beam 420, will create three diffractive beams (not illustrated) and three additional cooling beams 580A, 580B, 580C, as will be described below with reference to FIG. 5C. The interior structural bracing 401 of the second sensor head 400 has been designed to reliably hold the vacuum chamber 405 in dynamic environments. The interior structural bracing 401 is made, for example, of a glass-reinforced epoxy laminate material such as FR-4. The vacuum chamber 405 may include as many as five optical ports, of which only four optical ports 425A-425D are illustrated in FIG. 4. These various optical ports 425A-425D will admit the beams required for the AI process as well as output the detection signals from the AI process.

As with the first sensor head 100, the second sensor head 400 employs two main input optical fibers from a laser generating system (not illustrated) to the second sensor head 400: (1) a single cooling beam 420 for creating the GMOT and (2) a combined pair of cross-linearly-polarized Raman beams that will be subsequently separated into a pair of counterpropagating Raman beams 430A, 430B for the AI operation. In addition, there is a single output multimode-fiber for atom detection, with corresponding atom detection optics (not shown) coupled to optical port 425D. The atom detection optics will be described below with reference to FIG. 6. In contrast to the first sensor head 100, which included a pair of output optical fibers for monitoring the optical power of the pair of counterpropagating Raman beams 130A, 130B, the second sensor head 400 includes a pair of photodetectors (not illustrated) to monitor the optical power of the pair of counterpropagating Raman beams 430A, 430B, as will be described below with reference to FIGS. 8A and 8B. The cooling beam 420 passes through a set of cooling beam optics 435 before passing through optical port 425A and into the vacuum chamber 405, as will be described below with reference to FIG. 7. The same input optical fiber that provides the cooling beam 420 may also provide the depump, repump, and detection beams.

The combined pair of cross-linearly-polarized Raman beams are separated by a set of Raman separator optics 440, as will be described below with reference to FIGS. 8A and 8B. The set of Raman separator optics 440 thereby creates the pair of counterpropagating Raman beams 430A, 430B, which are introduced into the vacuum chamber 405 via optical port 425B. One of the counterpropagating Raman beams 430A passes through the vacuum chamber 405 and out the optical port 425C, where it is redirected by Raman redirector optics 445 back into the vacuum chamber 405 via the same optical port 425C. The pair of counterpropagating Raman beams 430A, 430B pass through the atomic cloud 410 in a counterpropagating manner, thereby necessitating both the Raman separator optics 440 and the Raman redirector optics 445 in the second sensor head 400 illustrated in FIG. 4.

Figure 9A:
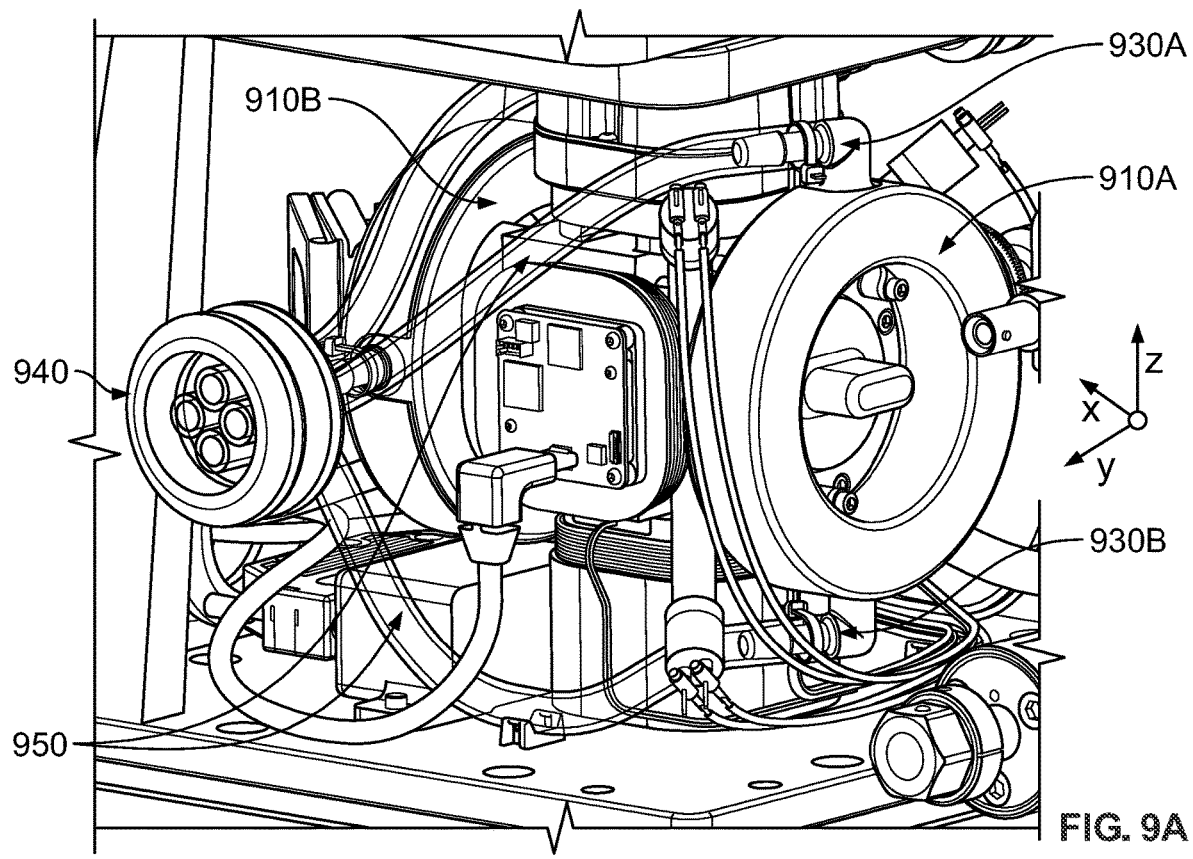
FIGS. 9A-9C illustrate the anti-Helmholtz coils and their respective cooling chambers of the second sensor head in accordance with one or more embodiments of the present invention.
Figure 9B:
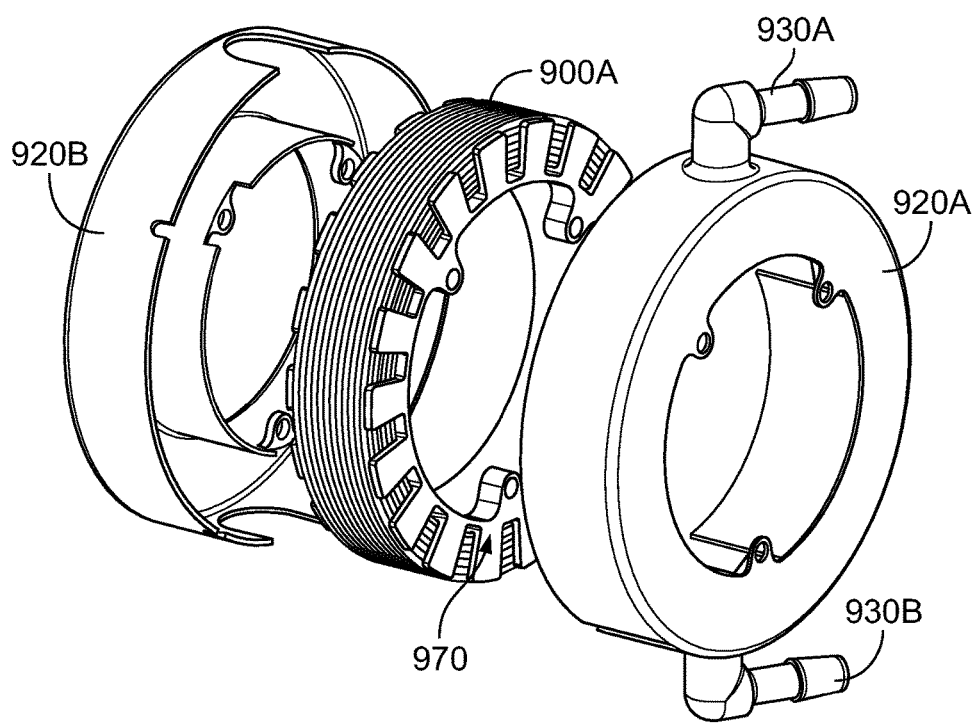
Figure 9C:
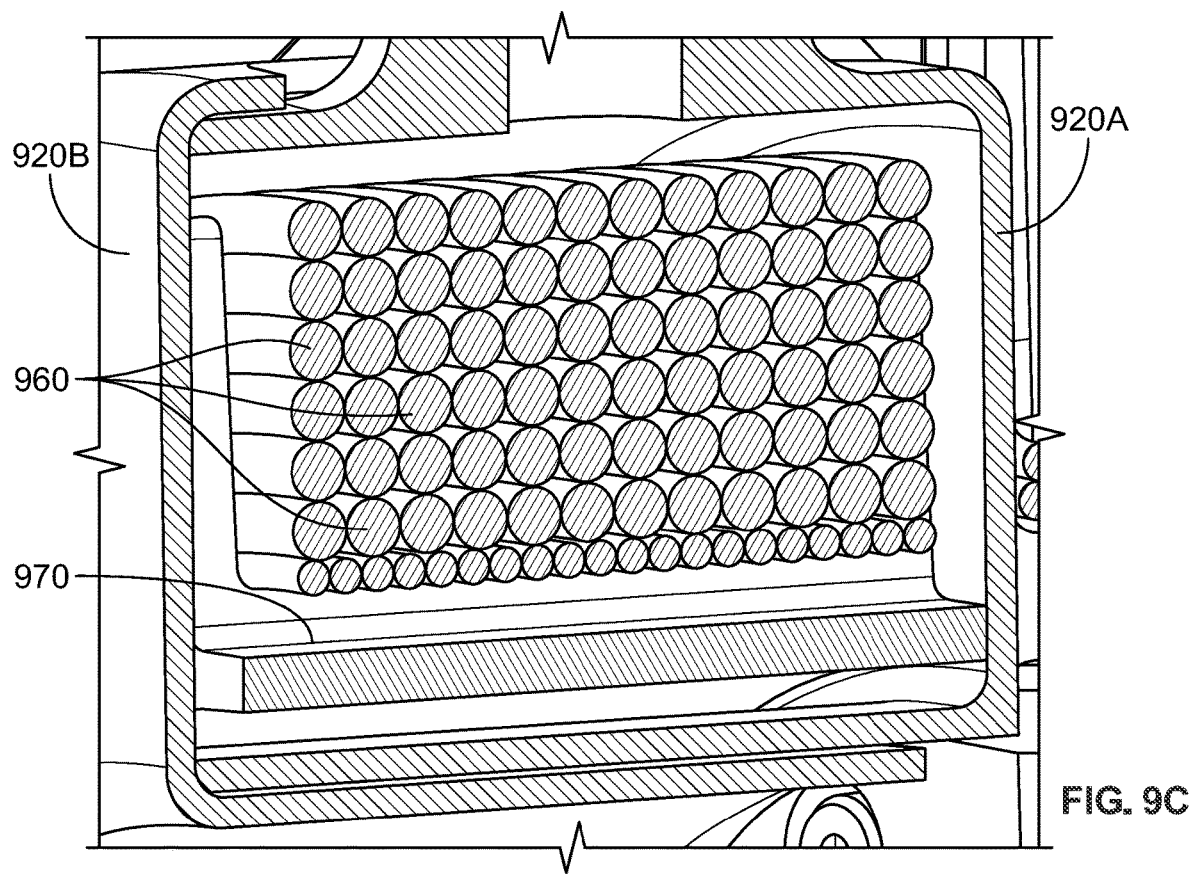

The second sensor head 400 includes a pair of anti-Helmholtz coils 450A, 450B on opposite sides of the second sensor head 400. The pair of anti-Helmholtz coils 450A, 450B are used to generate a magnetic field gradient for the MOT necessary to create the atomic cloud 410 used in the AI process. As the current used to drive the pair of anti-Helmholtz coils 450A, 450B can cause them to heat, the pair of anti-Helmholtz coils 450A, 450B are enclosed within corresponding cooling chambers 455A, 455B. Cooling air can then be circulated through the cooling chambers 455A, 455B, thereby cooling the pair of anti-Helmholtz coils 450A, 450B. FIGS. 9A-9C illustrate the pair of anti-Helmholtz coils 450A, 450B and their cooling chambers 455A, 455B in greater detail.

The majority of the second sensor head 400 is enclosed in a nested series of magnetic shields 460. The magnetic shields 460 minimize external magnetic fields that could reach the vacuum chamber 405 and affect the operation of the AI. The magnetic shields 460 may be formed of any suitable material. Exemplary materials for the magnetic shields 460 include high magnetic permeability metal alloys such as permalloy and mu-metal.

The second sensor head 400 further includes a Raman combiner 465 with a Raman beam switch. The Raman combiner 465, as will be described below with reference to FIGS. 10A and 10B, serves to combine and couple a pair of cross-linearly-polarized Raman beams to a single optical fiber for delivery to the second sensor head 400. The Raman beam switch, for example, an acousto-optic modulator (AOM), within the Raman combiner 465 switches the combined pair of cross-linearly-polarized Raman beams simultaneously to form the sequence of $\pi/2$, $\pi$, and $\pi/2$ pulses illustrated in FIG. 2. While the embodiment illustrated in FIG. 4 places the Raman combiner 465 outside of the magnetic shields 460, in other embodiments, the Raman combiner 465 is placed inside of the magnetic shields 460 or preferably within the vacuum chamber 405 itself, thereby eliminating the optical tether between the Raman combiner 465 and the vacuum chamber 405 and making the second sensor head 400 more robust in dynamic environments.

In certain embodiments, one of the optical ports 125, 425 may be used by a camera to image the atomic cloud 110, 410 within the vacuum chamber 105, 405. The camera may be, for example, a board CCD or CMOS camera. The camera may be used for diagnostic or monitoring purposes.

In certain embodiments, the vacuum chamber 105, 405 comprises a titanium chamber, fused-silica windows, alkali atom dispensers, getter vacuum pumps, and an ion vacuum pump that is connected to the vacuum chamber 105, 405 through a copper tube. The copper tube can be pinched off for systems that are passively vacuum pumped. For a low-SWaP (size, weight, and power) sensor head 100, 400, it is preferably a passively pumped vacuum chamber 105, 405, thereby overcoming the need for a corresponding ion vacuum pump. U.S. patent application Ser. No. 16/840,637, entitled "Passively Pumped, Polycrystalline Ceramic High and Ultra-High Vacuum Chambers" and assigned to the same assignee as this application, the contents of which are incorporated herein by reference, describes such a passively pumped vacuum chamber. As described in U.S. patent application Ser. No. 16/840,637, the vacuum chamber 105, 405 may alternatively be formed of a polycrystalline ceramic, such as alumina, or silicon nitride, aluminum nitride, steatite (MgO—SiO$_2$), or other oxide, nitride, or carbide-based polycrystalline ceramic. As also described in U.S. patent application Ser. No. 16/840,637, the windows in each of the optical ports 125A-125D, 425A-425D may alternatively be formed of a transparent ceramic, such as sapphire, aluminum oxynitride, yttrium oxide, or yttria-alumina garnet, and preferably include an anti-reflection coating.

The structural elements of the sensor head 100, 400 may be formed of any suitable material, though lighter materials may be preferable for applications in which excess weight is undesirable. Exemplary light-weight materials include 30% glass-filled polyether ether ketone (PEEK) and glass-reinforced epoxy laminate materials such as FR-4. The interior structural elements 101, 401 of the sensor head 100, 400 are preferably made of FR-4. These materials are also flight capable, having met NASA's outgassing specifications.

The Raman redirector optics 145, 445 are preferably formed of a pair of turning mirrors, for example, retroreflecting hollow roof prism mirrors. The size of the turning mirrors should be selected to capture as much of the counterpropagating Raman beam 130A, 430A as possible to minimize power loss. The spacing between the pair of turning mirrors should be selected to ensure that the pair of counterpropagating Raman beams 130A/130B, 430A/430B are substantially overlapping.

Figure 5A:
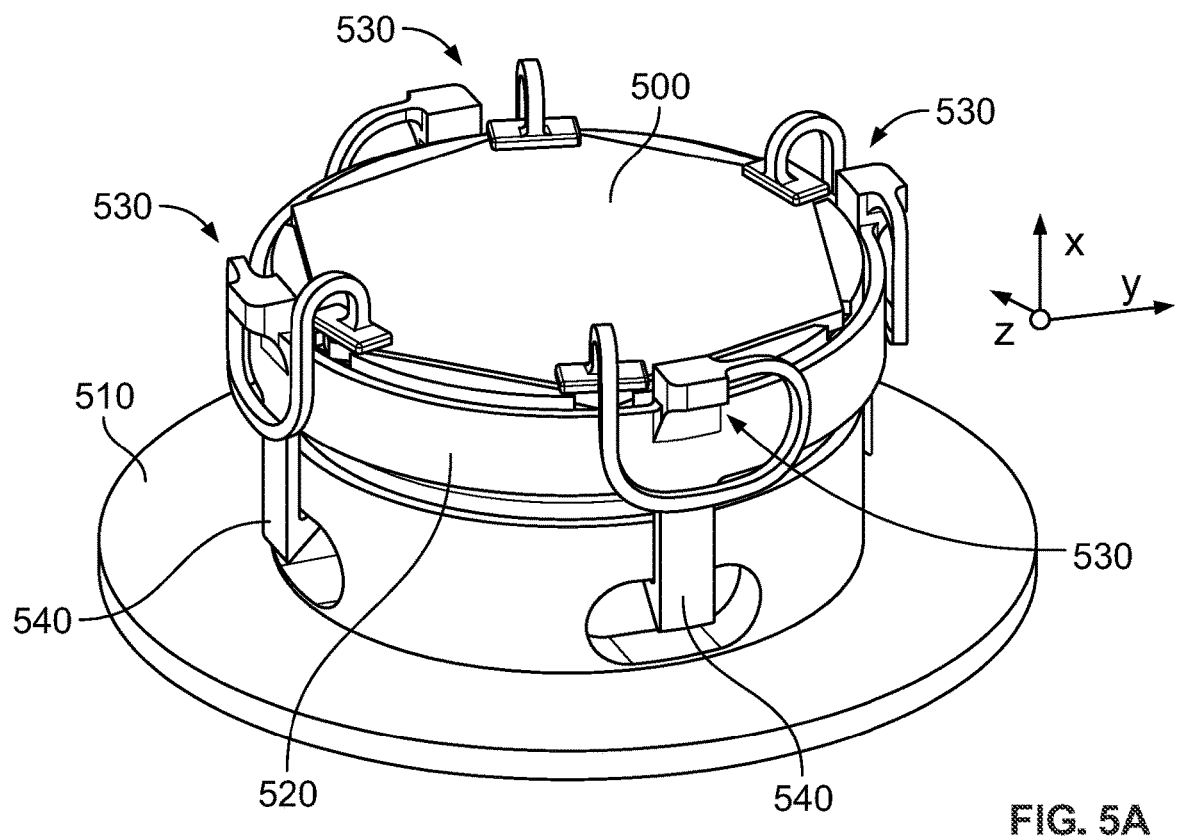
Figure 5B:
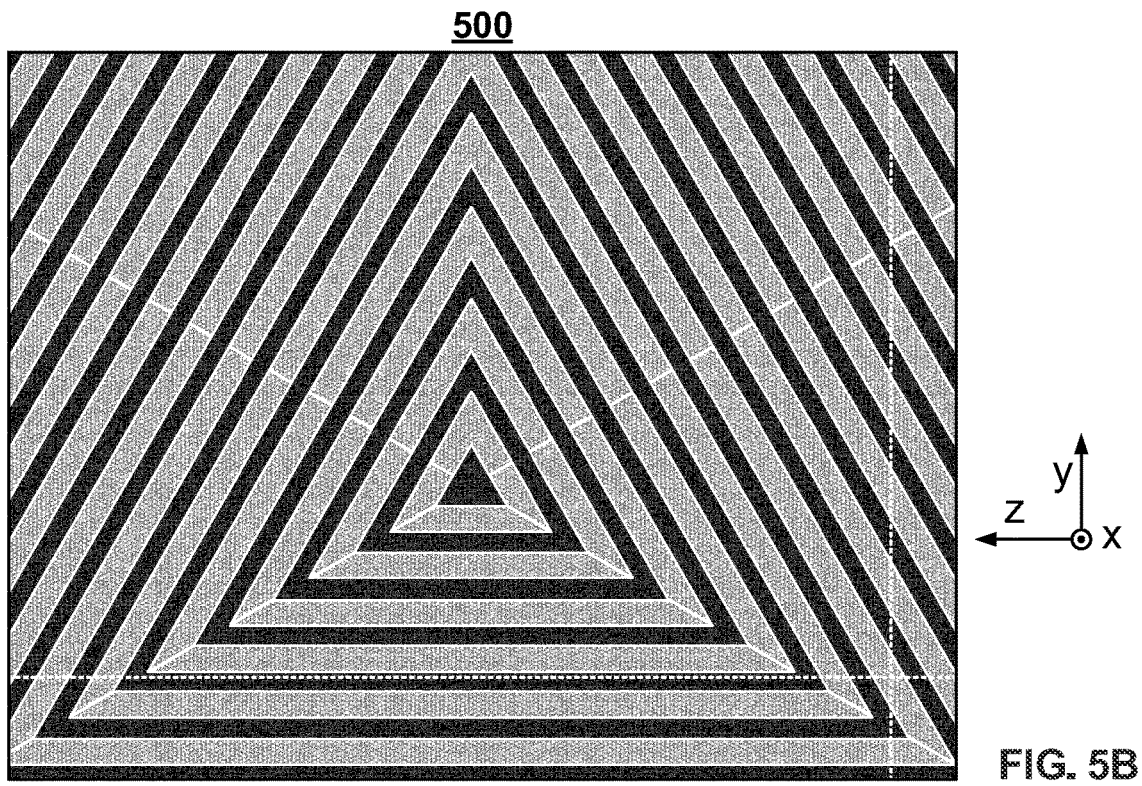
Figure 5C:
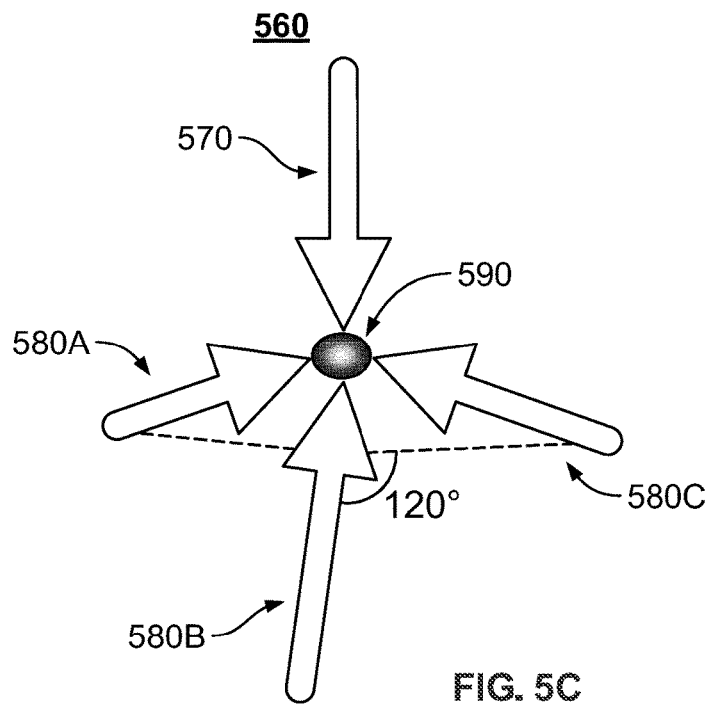
FIG. 5C illustrates the corresponding beams.

While the Raman redirector optics 145, 445 are illustrated in FIGS. 1 and 4 as being located outside the vacuum chamber 105, 405 and adjacent to optical port 125C, 425C, the Raman redirector optics may be located within the vacuum chamber 105, 405 in other embodiments. For example, Raman redirector optics may be mounted to a flanged pedestal with a set of clips. A similar mounting configuration is illustrated in FIGS. 5A and 5B for the reflective grating chip 500. The flanged pedestal may be formed of a machined titanium alloy, while the set of clips may be formed of a titanium alloy using a three-dimension (3D) printing process, for example, a laser sintering process, though other suitable materials and fabrication methods can be employed. The set of clips may be attached to the flanged pedestal via a series of locking tabs. The flanged pedestal is welded or brazed into a mounting port found in the vacuum chamber 105, 405 in place of the optical port 125C, 425C. In still other embodiments, the Raman redirector optics may be mounted in a flanged cup if the vacuum chamber 105, 405 is too small to employ the flanged pedestal just discussed. As with the flanged pedestal configuration, the Raman redirector optics will be located within the vacuum chamber 105, 405 with the flanged cup configuration.

By hard mounting the Raman redirector optics to the flanged pedestal (or flanged cup) and brazing the flanged pedestal/cup to the vacuum chamber 105, 405, the entire Raman redirector optics assembly is very robust and can tolerate the mechanical vibrations found in a dynamic environment without losing alignment. This is in contrast to prior art Raman redirector optics that employed epoxy to mount the Raman redirector optics, which would not withstand the rigors of a dynamic environment. Further, due to outgassing of the epoxy, it was not compatible with the high vacuum levels required for the vacuum chambers, especially if the vacuum chamber uses passive vacuum pumping. In like manner, the epoxy was not compatible with the high temperature employed to bake out the vacuum chamber, especially if the vacuum chamber will use passive vacuum pumping.

In certain embodiments, a microwave antenna (not illustrated) is integrated into the vacuum chamber 105, 405 or is externally located adjacent to the vacuum chamber 105, 405 or sensor head 100, 400. This microwave antenna directly addresses the microwave transition between the two ground states of atoms, for example, 6.835 GHz when the atomic cloud 110, 410 is formed of $^{87}$Rb atoms. The microwave antenna would directly couple to the atomic cloud 110, 410 in a Doppler-free way, i.e., no state-dependent momentum kicks, which can be used to diagnose atomic coherence and prepare the initial atomic state of the atomic cloud 110, 410 for the AI process.

The first sensor head 100 illustrated in FIG. 1 and the second sensor head illustrated in FIG. 4 employ a non-retroreflecting configuration, thereby necessitating the use of Raman separator optics 140, 440 and Raman redirector optics 145, 445. The non-retroreflecting configuration of the first and second sensor heads 100, 400 is good for separating the pair of counterpropagating Raman beams, but is sensitive to the phase relationship between the pair of counterpropagating Raman beams, thus necessitating some type of phase locking. In contrast, certain embodiments employ a retroreflecting configuration. The retroreflecting configuration is good at minimizing phase noise between the pair of counterpropagating Raman beams due to the pair of counterpropagating Raman beams sharing a common optical path, but needs to separate the atomic responses resulting from the Doppler-free and Doppler-sensitive Raman beams.

A sensor head for implementing the retroreflection configuration does not require Raman separator optics 140 or Raman redirector optics 145. See I. Perrin et al., "Zero-velocity atom interferometry using a retroreflected frequency-chirped laser," Physical Review A, vol. 100, art. no. 053618 (2019), the contents of which are incorporated herein by reference. The optical system for the retroreflection configuration does not need the Raman separator optics 140, 440, and replaces the Raman redirector optics 145, 445 with Raman retroreflection optics that include a quarter-wave plate located in front of a mirror. Another difference, for example, is that the retroreflection configuration employs a pair of parallel-linearly-polarized Raman beams, as opposed to the pair of cross-linearly-polarized Raman beams employed by the non-retroreflection configuration found in the first and second sensor heads 100, 400.

FIGS. 5A and 5B illustrate a reflective grating chip 500 in accordance with one or more embodiments. The reflective grating chip 500 is mounted to a flanged pedestal 510 with a retaining ring 520 and set of clips 530. The retaining ring 520 and the flanged pedestal 510 may be formed of a machined titanium alloy, while the set of clips 530 may be formed of a titanium alloy using a 3D printing process, for example, a laser sintering process, though other suitable materials and fabrication methods can be employed. The set of clips 530 are welded to the retaining ring 520, while the retaining ring 520 is attached to the flanged pedestal 510 via a series of locking tabs 540. The flanged pedestal 510 is welded or brazed into a mounting port found in the vacuum chamber 105, 405.

By hard mounting the reflective grating chip 500 to the flanged pedestal 510 and brazing the flanged pedestal 510 to the vacuum chamber 105, 405, the entire reflective grating chip 500 assembly is very robust and can tolerate the mechanical vibrations found in a dynamic environment without losing alignment. This is in contrast to prior art reflective grating chips that employed epoxy to mount the reflective grating chips, which did not withstand the rigors of a dynamic environment. Further, due to outgassing of the epoxy, it was not compatible with the high vacuum levels required for the vacuum chambers, especially if the vacuum chamber uses passive vacuum pumping. In like manner, the epoxy was not compatible with the high temperature employed to bake out the vacuum chamber, especially if the vacuum chamber will use passive vacuum pumping.

FIG. 5B illustrates the grating pattern of the reflective grating chip 500 in accordance with one or more embodiments. Each of the three sections of the reflective grating chip 500 diffracts approximately 40% of the incident cooling beam into each of the +1/−1 orders, approximately 5% into the 0 order, with the remaining 15% into higher orders. The reflective grating chip 500 thus creates a total of six primary diffracted beams, of which only three of the diffracted beams are cooling beams due to their diffraction direction, resulting in the tetrahedral MOT 560 illustrated in FIG. 5C. These three diffracted cooling beams 580A, 580B, 580C, along with the incident cooling beam 570, serve to cool the atomic cloud 590. Note that due to the nature of the four total cooling beams, the atomic cloud 590, while having a generally circular cross-section in the plane parallel to the reflective grating chip 500, will have a generally elliptical cross-section in the plane perpendicular to the reflective grating chip 500, resulting in an overall "pancake" shaped atomic cloud 580.

The reflective grating chip 500 may be fabricated by depositing an approximately 195 nm thick $SiO_2$ layer on a Si wafer. An e-beam resist and corresponding e-beam exposure is used to form a 50:50 pattern in the e-beam resist having an approximately 1.2 μm pitch, i.e., the lines and spaces each have widths of approximately 600 nm. The e-beam resist pattern is transferred to the $SiO_2$ layer using an etch process. The resulting $SiO_2$/Si surface then receives an approximately 100 nm thick metal coating, for example an Al or Au metal coating. The reflective grating chip 500 may be formed by other suitable materials and fabrication methods. As will be appreciated by those of skill in the art, the dimensions of the various features of the reflective grating chip 500 will need to be tuned to match the wavelength of the cooling beam 570, which depends upon the atomic species used to form the atomic cloud 590. The dimensions provided in this paragraph correspond to those required for use with a $^{87}$Rb atomic cloud 590, and its corresponding cooling beam 570 having a wavelength of 780.24 nm.

While the described reflective grating chip 500 employs two levels, i.e., it is a binary grating, in other embodiments, the reflective grating chip 500 may be a multi-level grating, for example, by employing additional levels, or a blazed grating. The use of a multi-level grating or a blazed grating can reduce the amount of the cooling beam 570 that is reflected in the $0^{th}$ order and diffracted in orders other than the desired +1/−1 orders, thereby improving overall efficiency of the reflective grating chip 500. In certain embodiments, a triangular-shaped hole may be cut out of the center of the reflective grating chip 500 using, for example, a laser, to reduce reflection, i.e., $0^{th}$ order, of the cooling beam 570 and thereby minimize potential intensity imbalances in the tetrahedral MOT 560.

While the illustrated and described reflective grating chip 500 includes three sections, other embodiments may employ more than three sections.

Figure 6:
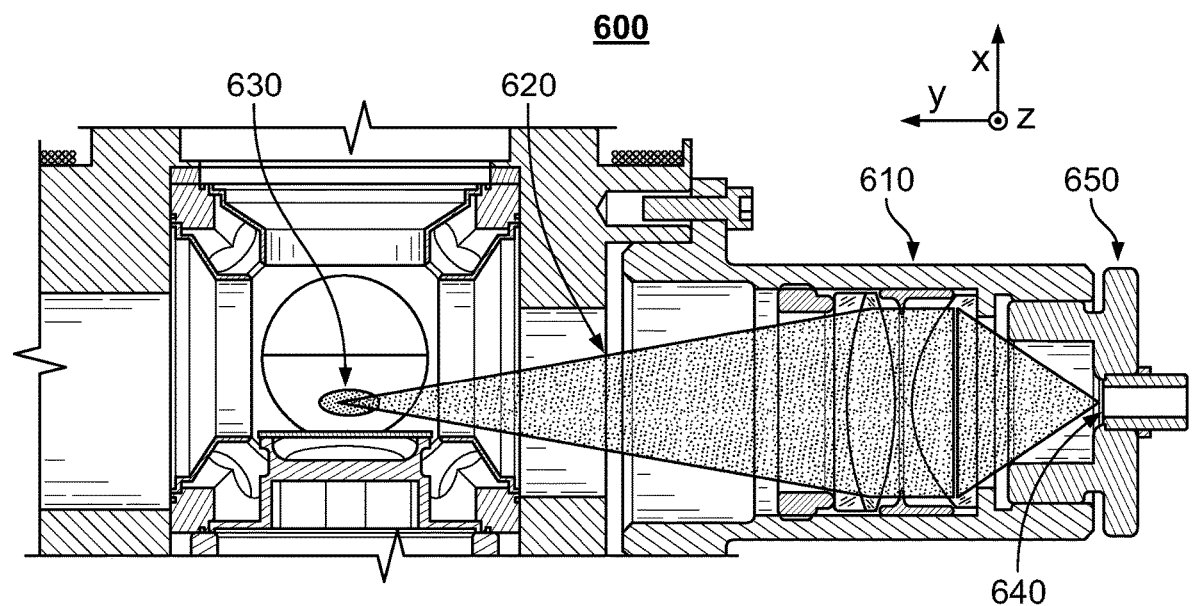
FIG. 6 illustrates the atom detection optics of the first sensor head in accordance with one or more embodiments of the present invention.

FIG. 6 illustrates the atom detection optics 600 of the first sensor head 100 in accordance with one or more embodiments. The second sensor head 400 includes the same atom detection optics configuration as the first sensor head 100. The atom detection optics 600 includes a lens set 610 for collecting the atomic fluorescence 620 from the atomic cloud 630 that exits optical port 125D, 425D of the vacuum chamber 105, 405. The collected atomic fluorescence 620 is focused onto the end of a multimode optical fiber 640 attached to the atom detection optics 600 via an optical fiber port 650, with a photodetector (not illustrated) connected to the opposite end of the multimode optical fiber 640. The atom detection optics 600 are optimally designed to detect maximum atomic signals after an AI sequence with an interrogation time.

In other embodiments, the atom detection optics may be integrated into the sensor head 100, 400 via hard mounting. For example, an atom detection photodetector may be mounted on a flanged pedestal or in a flanged cup using a set of clips, thereby locating the atom detection photodetector within the vacuum chamber 105, 405. As extraneous light may be present in the vacuum chamber 105, 405, i.e., light not due to the atomic cloud 110, 410, a spatial and/or frequency filter may be employed to reduce the noise due to this extraneous light. The spatial and/or frequency filter would be located within the vacuum chamber between the atomic cloud and the atom detection photodetector. Alternatively, the frequency filter could be formed on a surface of the atom detection photodetector.

In still other embodiments, the atom detection photodetector may be hard mounted to the exterior side of the optical port 125D, 425D of the vacuum chamber 105, 405 using a set of clips. As extraneous light may be present in the vacuum chamber 105, 405, i.e., light not due to the atomic cloud 110, 410, a spatial and/or frequency filter may be employed to reduce the noise due to this extraneous light. The spatial and/or frequency filter would be located within the vacuum chamber between the atomic cloud and the atom detection photodetector. Alternatively, the frequency filter could be formed on a surface of the atom detection photodetector.

By hard mounting the atom detection photodetector to the vacuum chamber 105, 405, either internally or externally, the entire atom detection optics assembly is very robust and can tolerate the mechanical vibrations found in a dynamic environment without losing alignment. This is in contrast to prior art atom detection optics that employed epoxy to mount the atom detection optics, which would not withstand the rigors of a dynamic environment. Further, due to outgassing of the epoxy, it was not compatible with the high vacuum levels required for the vacuum chambers, especially if the vacuum chamber uses passive vacuum pumping. In like manner, the epoxy was not compatible with the high temperature employed to bake out the vacuum chamber, especially if the vacuum chamber will use passive vacuum pumping.

Figure 7:
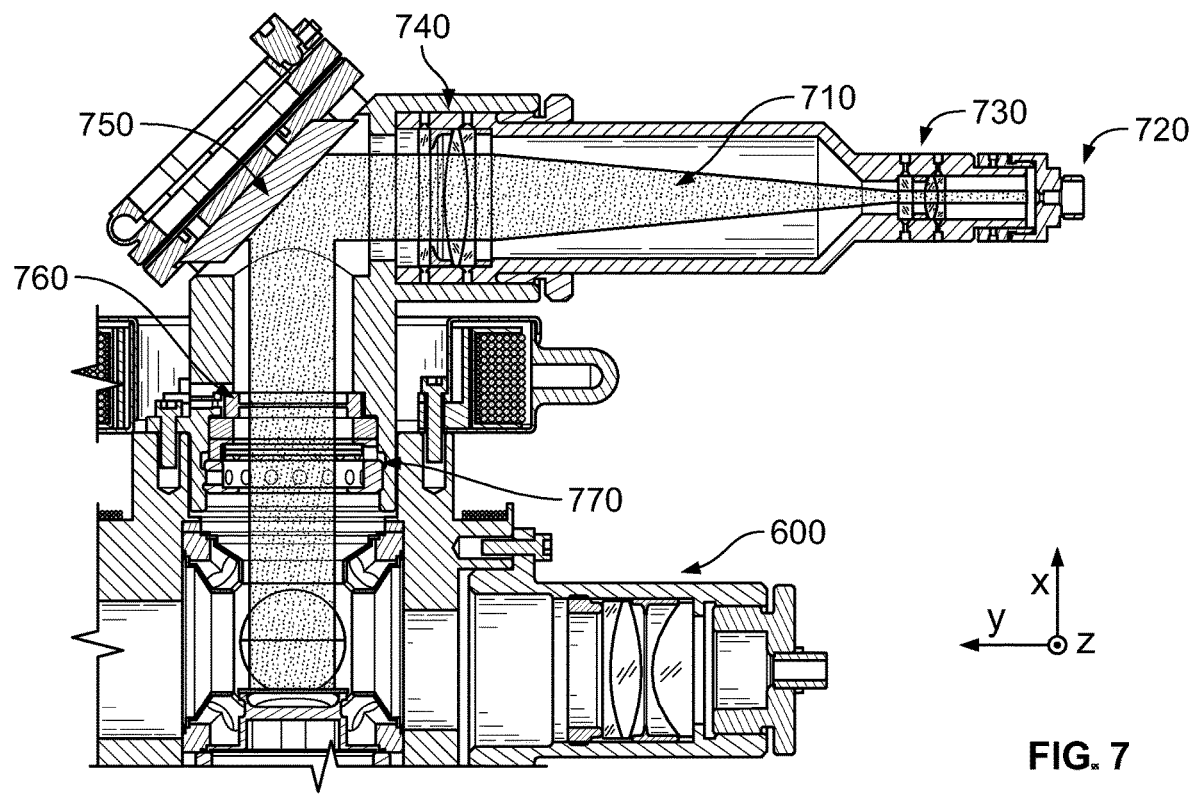
FIG. 7 illustrates the cooling beam optics of the second sensor head in accordance with one or more embodiments of the present invention.

FIG. 7 illustrates the cooling beam optics 700 of the second sensor head 400 in accordance with one or more embodiments. As with the truncated Gaussian beam of the first sensor head 100 (see FIG. 1), the cooling beam optics 700 of the second sensor head 400 produce a flat-top cooling beam 710, i.e., a cooling beam with an approximately uniform radial intensity. To increase the number of atoms in the atomic cloud, the cooling beam 710, annotated with stippling, preferably has a flat-top beam profile with approximately uniform radial intensity. This may be achieved in a number of ways, including through the use of two concave lenses and one achromatic doublet lenses, i.e., the cooling beam optics of the first sensor head 100, two achromatic doublet lenses with an intensity corrector and a phase corrector, i.e., the cooling beam optics 700 of the second sensor head 400, a beam shaper, an apodizing filter, or some combination thereof.

The cooling beam optics 700 of the second sensor head 400 starts from an optical fiber port 720, coupled to a polarization maintaining optical fiber (not illustrated). After the fiber port 720, the cooling beam 710 expands and is collimated as it passes through two lens sets 730, 740. The lens set 730 may include, for example, an achromatic doublet, i.e., a first element of lens set 730, and an intensity corrector, i.e., a second element of lens set 730. The intensity corrector modifies the cooling beam 710 so that its intensity has the desired flat-top beam profile, though this process may introduce aberrations to the cooling beam 710. The lens set 740 may include, for example, an achromatic doublet, i.e., a first element of lens set 740, and a phase corrector, i.e., a second element of lens set 740, with the phase corrector adjusting the wavefront of the expanded cooling beam 710, thereby correcting the aberrations introduced by the intensity corrector. Through two lens sets 730, 740, the cooling beam 710 is collimated and sized to the grating diameter with a flat-top intensity profile and a corrected wavefront.

The cooling beam 710, having been expanded and collimated by the lens sets 730, 740 is redirected 90° by a turning mirror 750. The turning mirror 750 in some embodiments is fixed, while in other embodiments the turning mirror 750 is mounted to a lockable tip-tilt flexure mount to facilitate alignment of the cooling beam 710. For the cooling beam optics 135 of the first sensor head 100 illustrated in FIG. 1A, the turning mirror 137 is fixed on the sensor head without this flexure mount. After the turning mirror 750, the cooling beam 710 then passes through a linear polarizer 760 before passing through a quarter-wave plate on a rotatable mount 770 to thereby impart a circular polarization. After passing through the quarter-wave plate 770, the cooling beam 710 enters the vacuum chamber 105, 405, via a corresponding optical port 125A, 425A. In some embodiments, the turning mirror 750 may be located between the lens sets 730, 740, while in other embodiments, the turning mirror may be omitted entirely.

In at least one embodiment, during the AI process, the single cooling beam 710 can be switched to the depump beam in a time multiplexed manner in accordance with FIG. 2 using an SSB frequency modulator, such as that disclosed in U.S. patent application Ser. No. 16/831,350.

Figure 8A:
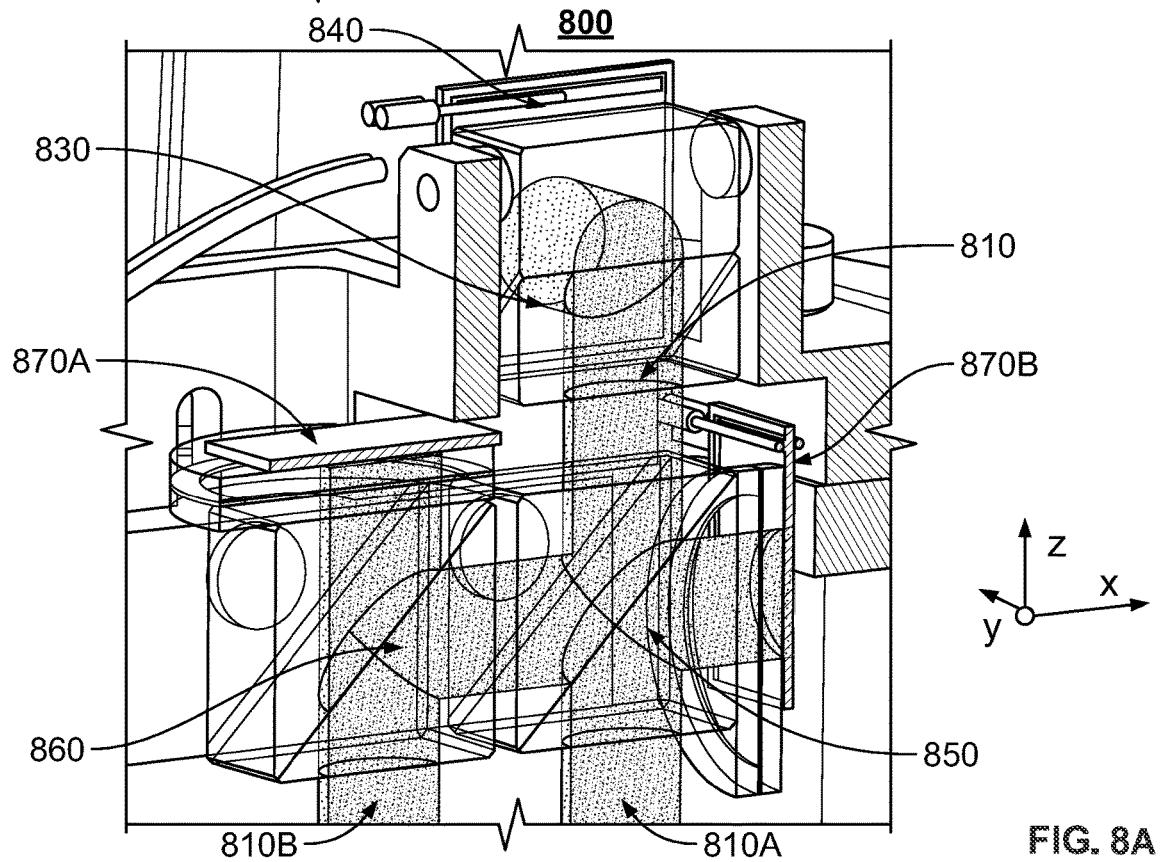
FIGS. 8A and 8B are 3D illustrations of the Raman separator optics of the second sensor head in accordance with one or more embodiments of the present invention.
Figure 8B:
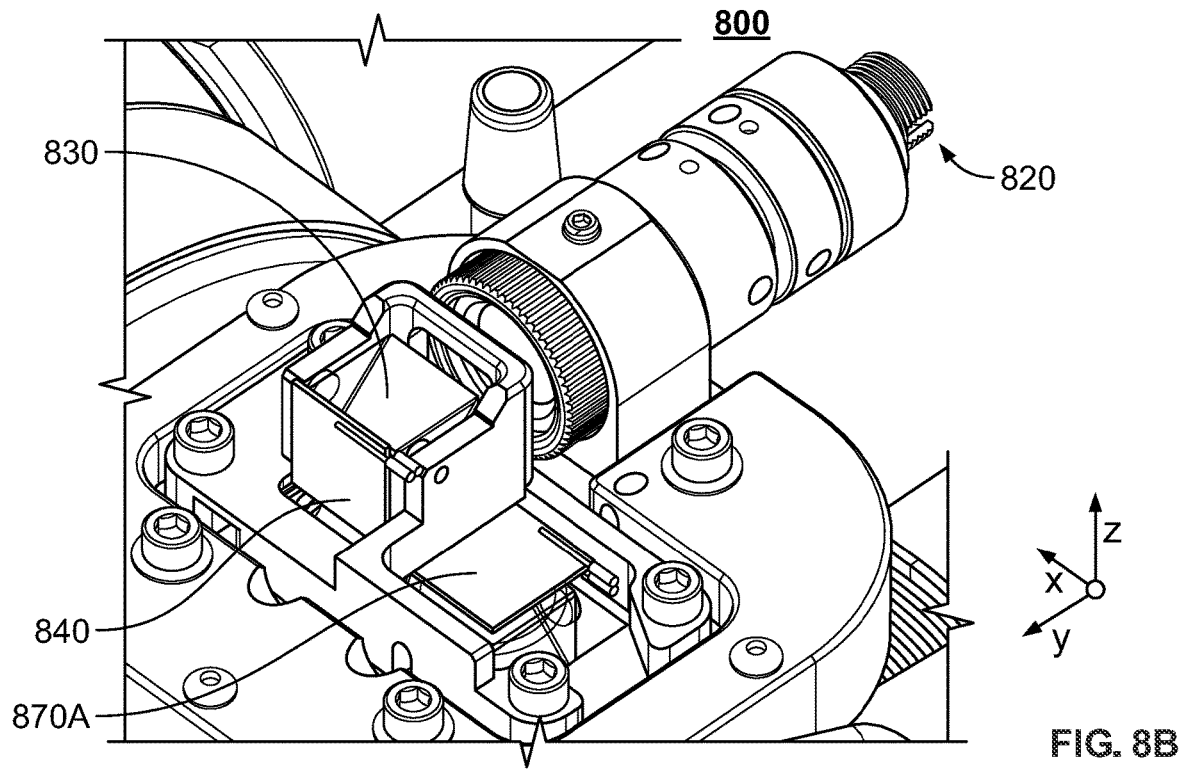

FIGS. 8A and 8B are 3D illustrations of the Raman separator optics 800 of the second sensor head 400 in accordance with one or more embodiments. The combined pair of cross-linearly-polarized incoming Raman beams 810, annotated with stippling, are coupled to the Raman separator optics 800 via an optical fiber (not illustrated) coupled to an optical fiber port 820. The combined pair of cross-linearly-polarized incoming Raman beams 810 are then redirected 90° by a non-polarizing beam splitter 830, the beam splitter 830 having a splitting ratio of, for example, 90:10. In this example, 90% of the combined pair of cross-linearly-polarized incoming Raman beams 810 would be redirected to a first polarizing beam splitter 850, while the remaining 10% of the combined pair of cross-linearly-polarized incoming Raman beams 810 would pass on to a fast photodetector 840 to monitor the beat-note frequency between the combined pair of cross-linearly-polarized incoming Raman beams 810 for phase-locking purposes. The beat-note frequency is demodulated down to a near-DC signal which is then used as feedback for a voltage controlled oscillator (VCO) or a direct digital synthesizer (DDS) (not illustrated) connected to a phase-lock light modulation device 1100, for example, a free-space/fiber-coupled AOM or an SSB frequency modulator (illustrated in FIG. 11). This phase-lock light modulation device 1100 is independent of the Raman beam switch 1040 in the Raman combiner 1000. The phase lock process may, for example, employ a proportional-integral-derivative (PID) controller. (As will be discussed below with respect to FIGS. 10A and 10B, the fast photodetector for beat-note detection in other embodiments may be incorporated as part of the Raman combiner 1000 to continuously monitor the beat-note frequency between the two Raman beams for phase-locking purposes.)

The combined pair of cross-linearly-polarized incoming Raman beams 810 are separated by the first polarizing beam splitter 850, with a first counterpropagating Raman beam 810A passing through the first polarizing beam splitter 850, while the second counterpropagating Raman beam 810B is redirected to a second polarizing beam splitter 860, which redirects the second counterpropagating Raman beam 810B such that the pair of counterpropagating Raman beams 810A, 810B are substantially parallel but laterally offset from each other as they pass through the optical port 125B, 425B and into the vacuum chamber 105, 405. The Raman separator optics 800 may optionally include two photodetectors 870A, 870B to monitor the power of the pair of counterpropagating Raman beams 810A, 810B. Note that due to the polarized nature of the pair of counterpropagating Raman beams 810A, 810B, the first counterpropagating Raman beam 810A, having passed through the atomic cloud 110, 410, will pass through the second polarizing beam splitter 860 and be detected by the photodetector 870A. In like manner, the second counterpropagating Raman beam 810B, having passed through the atomic cloud 110, 410 and been redirected by the Raman redirector optics 145, 445, will be redirected by the first polarizing beam splitter 850 and be detected by the photodetector 870B.

In certain embodiments, the Raman separator optics 800 includes additional optical elements to give the pair of counterpropagating Raman beams 810A, 810B a flat-top beam profile. As with the cooling beam optics 700, these additional optical elements may include, for example, two concave lenses and one achromatic doublet lenses, e.g., the cooling beam optics of the first sensor head 100, two achromatic doublet lenses with an intensity corrector and a phase corrector, e.g., the cooling beam optics 700 of the second sensor head 400, a beam shaper, an apodizing filter, or some combination thereof. The pair of counterpropagating Raman beams 810A, 810B, having a flat-top beam profile with a corrected wavefront, provide for a more spatially homogeneous atom-light interaction in the AI process. Any potential wavefront distortion of the pair of counterpropagating Raman beams 810A, 810B can be minimized using these optical elements.

FIGS. 9A-9C illustrate the anti-Helmholtz coils 900A and their respective cooling chambers 910A, 910B of the second sensor head 400 in accordance with one or more embodiments. As illustrated in FIG. 9B, each cooling chamber 910A, 910B may be formed of two halves 920A, 920B. The gaseous cooling medium enters and exits the cooling chamber 910A via corresponding gaseous cooling ports 930A, 930B attached to one of the halves 920A. As illustrated in FIG. 9A, the gaseous cooling ports 930A, 930B are attached to a gaseous coupling port 940 via corresponding gaseous cooling ducts 950.

FIG. 9C illustrates a cross-sectional view of the anti-Helmholtz coil 900A and its cooling chamber 910A. The wires 960 used to form the anti-Helmholtz coil 900A are spaced apart so that the gaseous cooling medium can come into contact with each wire 960, and not just those around the periphery of the bundle of wires 960. FIGS. 9B and 9C also illustrate the reel 970 around which the bundle of wires 960 is wrapped.

Note that while the embodiment illustrated in FIGS. 9A-9C employs two cooling chambers 910A, 910B, other embodiments may not require active cooling of the anti-Helmholtz coils 900A. Those embodiments do not include the two cooling chambers 910A, 910B, or the corresponding gaseous coupling port 940 and gaseous cooling ducts 950.

Depending upon the application, the gaseous cooling medium used for cooling the anti-Helmholtz coils 900A may be air circulated by a fan. In other applications, the gaseous cooling medium may be a gas, for example, nitrogen, supplied by a pressurized bottle.

Figure 10A:
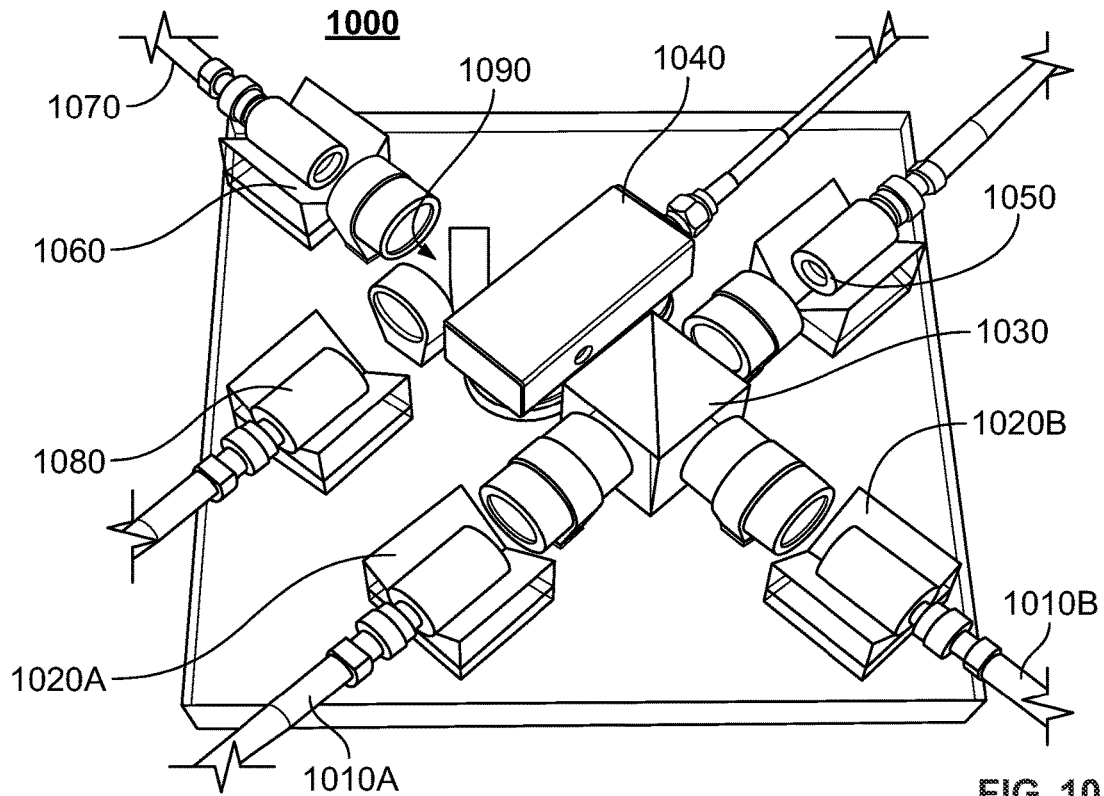
FIG. 10A is a photograph of a Raman combiner in accordance with one or more embodiments of the present invention.
Figure 10B:
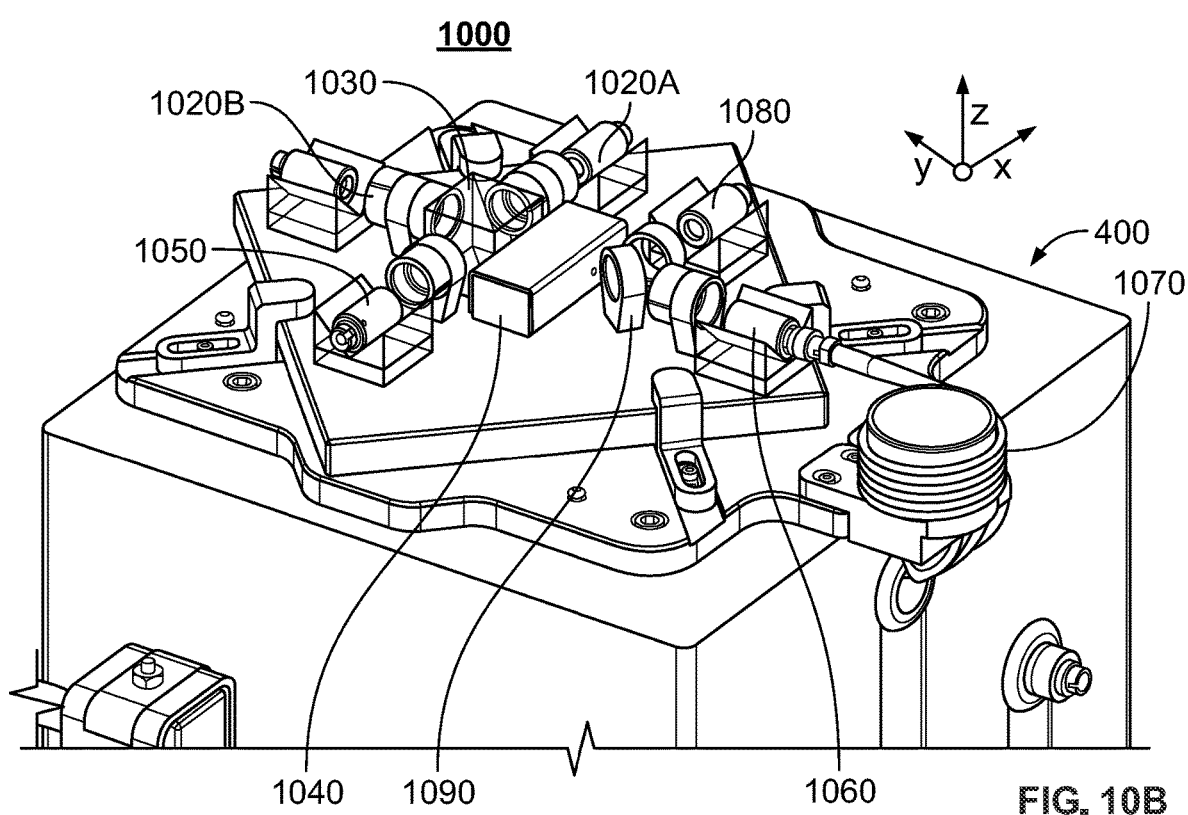
FIG. 10B illustrates a Raman combiner attached to the second sensor head in accordance with one or more embodiments of the present invention.
Figure 11:
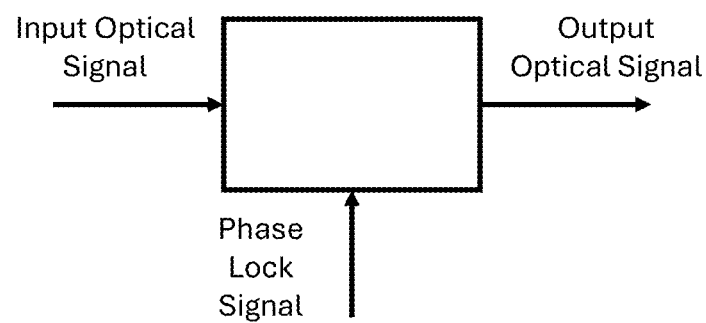
FIG. 11 illustrates a phase-lock light modulation device that may be employed with a sensor head in accordance with one or more embodiments of the present invention.

FIG. 10A is a photograph of a standalone Raman combiner 1000, while FIG. 10B illustrates the Raman combiner 1000 located on the top of the second sensor head 400. The two Raman beams (not illustrated) are coupled to the Raman combiner 1000 via corresponding optical fibers 1010A, 1010B and corresponding input optics 1020A, 1020B. The pair of cross-linearly-polarized Raman beams are then combined using a polarizing beamsplitter 1030, which directs the combined pair of cross-linearly-polarized Raman beams to a Raman beam switch 1040, for example, an AOM, which switches the combined pair of cross-linearly-polarized Raman beams simultaneously to form the sequence of $\pi/2$, $\pi$, and $\pi/2$ pulses illustrated in FIG. 2. A portion of the combined pair of cross-linearly-polarized Raman beams is optionally directed to an optical monitor 1050 by the polarizing beamsplitter 1030, with the optical monitor 1050 monitoring the beat-note frequency between the combined pair of cross-linearly-polarized Raman beams. To generate the portion of the combined pair of cross-linearly-polarized Raman beams directed to the optical monitor 1050, the input optics 1020A, 1020B may each include polarizers at a slight angle to the polarization of the Raman beams. By adjusting the angle of the polarizers, more or less of the combined pair of cross-linearly-polarized Raman beams may be directed to the optical monitor 1050.

The optical monitor 1050, which includes a fast photo diode, monitors the beat-note frequency, for example, 6.835 GHz for $^{87}$Rb atoms, between the combined pair of cross-linearly-polarized Raman beams. The beat-note frequency is demodulated down to a near-DC signal, which is then used as feedback for a VCO or a DDS (not illustrated) connected to a phase-locked light modulation device, for example, a free-space/fiber-coupled AOM or an SSB frequency modulator (not illustrated). This phase-lock light modulation device is independent of the Raman beam switch 1040. The phase lock process may, for example, employ a PID controller. The origin of the phase instability is the different optical paths between the pair of cross-linearly-polarized Raman beams, which can occur when a long optical tether, for example, the optical fibers 1010A, 1010B, 1070, are used to deliver the combined pair of cross-linearly-polarized Raman beams from their respective systems to the sensor head 100, 400. Phase instabilities may also be due to the respective systems generating each of the pair of cross-linearly-polarized Raman beams. Specifically, the pair of cross-linearly-polarized Raman beams start from a single 1560-nm fiber laser that traverses two separate optical channels, each of which may comprise a 1560-nm in-phase quadrature-phase (IQ) modulator, an erbium doped fiber amplifier (EDFA), and a second harmonic generator (SHG) to generate the desired 780 nm pair of cross-linearly-polarized Raman beams.

The phase-locked combined pair of cross-linearly-polarized Raman beams, having passed through the Raman beam switch 1040, are then directed to a Raman beam output port 1060 and corresponding optical fiber 1070, which carries the combined pair of cross-linearly-polarized Raman beams to the Raman separator optics 140, 440.

Minimizing the phase noise of the beat-note frequency between the pair of cross-linearly-polarized Raman beams is critical for high-sensitivity AI operation. To this end, random vibration analysis may be undertaken of the optomechanical design of the various Raman beam optics systems to reduce mechanical displacements in three axes and help to maintain the phase relation between the pair of cross-linearly-polarized Raman beams. In addition, the phase-lock scheme with a phase-locked light modulation device, a frequency control device, and a PID lock controller, have been implemented for high performance.

Figure 12:
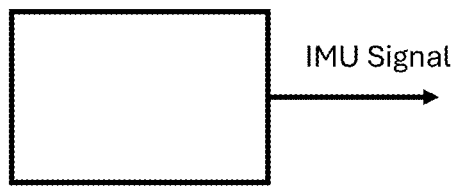
FIG. 12 illustrates an inertial measurement unit (IMU) co-sensor that may be employed with a sensor head in accordance with one or more embodiments of the present invention.

In certain embodiments, an additional inertial measurement unit (IMU) co-sensor 1200, as illustrated in FIG. 12, can be included to implement common-mode noise rejection through signal processing. For example, signal processing employing the IMU co-sensor signal may be used to reject common-mode noise in the AI signal due to vibrations in a high dynamic environment.

In at least one embodiment, the optical fiber 1070 that carries the combined pair of cross-linearly-polarized Raman beams to the Raman separator optics 140, 440 of the sensor head 100, 400 carries the repump and detection beams in a time multiplexed manner as shown in FIG. 2. The Raman combiner 1000 thus includes input optics 1080 for the repump and detection beams and a non-polarizing beam splitter 1090 to redirect the repump and detection beams to the Raman beam output port 1060. In at least one other embodiment, during the AI process, the combined pair of cross-linearly-polarized Raman beams can be combined with the repump and detection beams in a time multiplexed manner using an SSB frequency modulator, such as that disclosed in U.S. patent application Ser. No. 16/831,350.

In certain embodiments, the various Raman-related optics may be mounted on translation and/or rotation stages to counteract the motion of the atomic cloud relative to the pair of counterpropagating Raman beams. For example, on-axis acceleration parallel to the direction of the counterpropagating Raman beams can be compensated for using of a feedforward process that detunes the counterpropagating Raman beams. See U.S. patent application Ser. No. 17/396,902, entitled "Hybrid Inertial Navigation System and Method" and assigned to the same assignee as this application, the contents of which are incorporated herein by reference.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A compact grating magneto-optical trap sensor head comprising:
    a vacuum chamber, the vacuum chamber adapted to support an atomic cloud for atomic interferometry, the vacuum chamber including at least one mounting port and at least two optical ports;
    cooling beam optics, the cooling beam optics adapted to receive a cooling beam, the cooling beam optics adapted to create a flat-top cooling beam by causing a radial intensity of the cooling beam to be approximately uniform, the cooling beam optics adapted to transmit the flat-top cooling beam through a first of the at least two optical ports;
    a reflective grating chip, the reflective grating chip adapted to receive the flat-top cooling beam and to diffract the received flat-top cooling beam into at least three diffracted cooling beams, the flat-top cooling beam and the at least three diffracted cooling beams adapted to cool the atomic cloud, the reflective grating chip being hard mounted to a first of the at least one mounting port, the reflective grating chip being located within the vacuum chamber;
    atom detection optics, the atom detection optics adapted to receive atomic fluorescence from the atomic cloud;
    Raman separator optics, the Raman separator optics adapted to receive a combined pair of cross-linearly-polarized Raman beams and to separate the combined pair of cross-linearly-polarized Raman beams into first and second counterpropagating Raman beams, the Raman separator optics adapted to direct the first and second counterpropagating Raman beams through a second of the at least two optical ports, the Raman separator optics adapted to direct the second counterpropagating Raman beam to the atomic cloud, the first and second counterpropagating Raman beams adapted to implement atomic interferometry with the atomic cloud;
    Raman redirector optics, the Raman redirector optics adapted to receive the first counterpropagating Raman beam and to redirect the received first counterpropagating Raman beam to the atomic cloud such that the first and second counterpropagating Raman beams are substantially overlapping and counterpropagating through the atomic cloud; and
    a pair of anti-Helmholtz coils, the pair of anti-Helmholtz coils adapted to generate a magnetic field gradient for a magneto-optical trap, the magneto-optical trap necessary to create the atomic cloud, a first of the pair of anti-Helmholtz coils adjacent a first face of the vacuum chamber, a second of the anti-Helmholtz coils adjacent a second face of the vacuum chamber opposite the first face of the vacuum chamber.

2. The compact grating magneto-optical trap sensor head of claim 1, wherein the cooling beam optics include:
    at least one lens set, the at least one lens set adapted to receive the cooling beam, the at least one lens set adapted to expand the cooling beam and to cause a radial intensity of the cooling beam to be approximately uniform, the at least one lens set including at least one of:
two concave lenses and an achromatic doublet lens;
two achromatic doublet lenses, an intensity corrector, and a phase corrector;
a beam shaper; or
an apodizing filter;
a polarizer, the polarizer adapted to receive and to linearly polarize the expanded cooling beam; and
a quarter-wave plate, the quarter-wave plate adapted to receive and to circularly polarize the linearly polarized expanded cooling beam and to transmit the circularly polarized cooling beam through the first of the at least two optical ports as the flat-top cooling beam.

3. The compact grating magneto-optical trap sensor head of claim 1, wherein the cooling beam optics are further adapted to receive a depump beam and to transmit the depump beam through the first of the at least two optical ports.

4. The compact grating magneto-optical trap sensor head of claim 1 further comprising:
a flanged pedestal, the flanged pedestal welded or brazed to a first of the at least one mounting port; and
a set of clips, the set of clips adapted to attach the reflective grating chip to the flanged pedestal, the reflective grating chip thereby being hard mounted to the first of the at least one mounting port.

5. The compact grating magneto-optical trap sensor head of claim 1,
wherein the reflective grating chip includes at least three sections, each of the at least three sections comprising a corresponding grating;
wherein each grating comprises one of a binary grating, a multi-level grating, or a blazed grating; and
wherein the reflective grating chip optionally includes an orifice at the center thereof, the orifice adapted to reduce reflection of the flat-top cooling beam.

6. The compact grating magneto-optical trap sensor head of claim 1, wherein the atom detection optics include a lens set, the lens set adapted to receive and to focus atomic fluorescence from the atomic cloud passing through a third of the at least two optical ports onto an optical fiber.

7. The compact grating magneto-optical trap sensor head of claim 1, wherein the atom detection optics include:
an atom detection photodetector, the atom detection photodetector adapted to receive atomic fluorescence from the atomic cloud and adapted to output a signal indicative of a power of the atomic fluorescence from the atomic cloud; and
a filter, the filter adapted to spatially or frequency filter extraneous light directed toward the atom detection photodetector, the filter being located between the atomic cloud and the atom detection photodetector;
wherein the atom detection photodetector is one of hard mounted and located within the vacuum chamber or hard mounted and located external and adjacent to the vacuum chamber.

8. The compact grating magneto-optical trap sensor head of claim 1, wherein the Raman separator optics include:
a first polarizing beam splitter, the first polarizing beam splitter adapted to receive and to separate the combined pair of cross-linearly-polarized Raman beams into the first and second counterpropagating Raman beams, the first polarizing beam splitter adapted to direct the first counterpropagating Raman beam to the Raman redirector optics through the second of the at least two optical ports and to redirect the second Raman beam;
a 45°-angled mirror, the 45°-angled mirror adapted to receive and to redirect the second counterpropagating Raman beam to the atomic cloud through the second of the at least two optical ports; and
optionally at least one lens set, the at least one lens set adapted to receive the combined pair of cross-linearly-polarized Raman beams, the at least one lens set adapted to cause a radial intensity of the combined pair of cross-linearly-polarized Raman beams to be approximately uniform, the at least one lens set including at least one of:
two concave lenses and an achromatic doublet lens;
two achromatic doublet lenses, an intensity corrector, and a phase corrector;
a beam shaper; or
an apodizing filter;
wherein the first counterpropagating Raman beam is substantially parallel to, and laterally offset from, the second counterpropagating Raman beam as the first and second counterpropagating Raman beams pass from the Raman separator optics to the vacuum chamber through the second of the at least two optical ports.

9. The compact grating magneto-optical trap sensor head of claim 1, wherein the Raman separator optics include:
a first polarizing beam splitter, the first polarizing beam splitter adapted to receive and to separate the combined pair of cross-linearly-polarized Raman beams into the first and second counterpropagating Raman beams, the first polarizing beam splitter adapted to direct the first counterpropagating Raman beam to the Raman redirector optics through the second of the at least two optical ports and to redirect the second counterpropagating Raman beam;
a second polarizing beam splitter, the second polarizing beam splitter adapted to receive and to redirect the second counterpropagating Raman beam to the atomic cloud through the second of the at least two optical ports; and
optionally at least one lens set, the at least one lens set adapted to receive the combined pair of cross-linearly-polarized Raman beams, the at least one lens set adapted to cause a radial intensity of the combined pair of cross-linearly-polarized Raman beams to be approximately uniform, the at least one lens set including at least one of:
two concave lenses and an achromatic doublet lens;
two achromatic doublet lenses, an intensity corrector, and a phase corrector;
a beam shaper; or
an apodizing filter;
wherein the first counterpropagating Raman beam is substantially parallel to, and laterally offset from, the second counterpropagating Raman beam as the first and second counterpropagating Raman beams pass from the Raman separator optics to the vacuum chamber through the second of the at least two optical ports.

10. The compact grating magneto-optical trap sensor head of claim 9, wherein the Raman separator optics further include:
a non-polarizing beam splitter, the non-polarizing beam splitter adapted to receive the combined pair of cross-linearly-polarized Raman beams, the non-polarizing beam splitter adapted to redirect a first portion of the combined pair of cross-linearly-polarized Raman beams to the first polarizing beam splitter, the non-polarizing beam splitter adapted to transmit a second portion of the combined pair of cross-linearly-polarized Raman beams; and a photodetector, the photodetector adapted to receive the second portion of the combined pair of cross-linearly-polarized Raman beams and to output a signal indicative of a beat-note frequency between the combined pair of cross-linearly-polarized Raman beams.

11. The compact grating magneto-optical trap sensor head of claim 9, wherein the Raman separator optics further include:

a first Raman beam photodetector, the first Raman beam photodetector adapted to receive the first counterpropagating Raman beam after the first counterpropagating Raman beam passes through the atomic cloud and passes through the second polarizing beam splitter, the first Raman beam photodetector adapted to output a signal indicative of a power of the first counterpropagating Raman beam; and a second Raman beam photodetector, the second Raman beam photodetector adapted to receive the second counterpropagating Raman beam after the second counterpropagating Raman beam passes through the atomic cloud, is redirected by the Raman redirector optics, and is redirected by the first polarizing beam splitter, the second Raman beam photodetector adapted to output a signal indicative of a power of the second counterpropagating Raman beam.

12. The compact grating magneto-optical trap sensor head of claim 1, wherein the Raman redirector optics include:

a first turning mirror, the first turning mirror adapted to receive and to redirect the first counterpropagating Raman beam from the Raman separator optics; and a second turning mirror, the second turning mirror adapted to receive the first counterpropagating Raman beam from the first turning mirror and to redirect the first counterpropagating Raman beam to the atomic cloud.

13. The compact grating magneto-optical trap sensor head of claim 12, wherein the Raman redirector optics are one of hard mounted and located within the vacuum chamber or hard mounted and located external and adjacent to the vacuum chamber.

14. The compact grating magneto-optical trap sensor head of claim 1, further comprising a Raman combiner, the Raman combiner including:

a polarizing beam splitter, the polarizing beam splitter adapted to receive a pair of cross-linearly-polarized Raman beams and to combine the pair of cross-linearly-polarized Raman beams to thereby form the combined pair of cross-linearly-polarized Raman beams;

a Raman beam switch, the Raman beam switch adapted to receive the combined pair of cross-linearly-polarized Raman beams and to simultaneously switch the combined pair of cross-linearly-polarized Raman beams; and a Raman beam output port, the Raman beam output port adapted to receive the combined pair of cross-linearly-polarized Raman beams and to direct the combined pair of cross-linearly-polarized Raman beams to the Raman separator optics.

15. The compact grating magneto-optical trap sensor head of claim 14, wherein the Raman combiner further includes a non-polarizing beam splitter, the non-polarizing beam splitter adapted to receive a repump beam and a detection beam and to redirect the repump beam and the detection beam to the Raman beam output port.

16. The compact grating magneto-optical trap sensor head of claim 14, wherein the Raman combiner further includes an optical monitor, the optical monitor adapted to receive a portion of the combined pair of cross-linearly-polarized Raman beams and to output a signal indicative of a beat-note between the combined pair of cross-linearly-polarized Raman beams, the signal indicative of the beat-note between the combined pair of cross-linearly-polarized Raman beams adapted for use to enable control of a phase-lock light modulation device.

17. The compact grating magneto-optical trap sensor head of claim 16, wherein the Raman combiner further includes a phase-lock light modulation device, the phase-lock light modulation device adapted to receive one of the pair of cross-linearly-polarized Raman beams, the phase-lock light modulation device adapted to adjust a phase of the received one of the pair of cross-linearly-polarized Raman beams based upon the signal indicative of the beat-note between the combined pair of cross-linearly-polarized Raman beams, the phase-lock light modulation device thereby locking a phase difference between the combined pair of cross-linearly-polarized Raman beams.

18. The compact grating magneto-optical trap sensor head of claim 1 further comprising an inertial measurement unit (IMU) co-sensor, the IMU co-sensor adapted to output a signal indicative of common-mode noise, the signal indicative of common-mode noise adapted for use to enable rejection of common-mode noise in an atomic interferometry signal due to vibrations.

* * * * *